(12) United States Patent
Chen et al.

(10) Patent No.: US 6,757,882 B2
(45) Date of Patent: Jun. 29, 2004

(54) SELF-DESCRIBING IP PACKAGE FOR ENHANCED PLATFORM BASED SOC DESIGN

(76) Inventors: Michael Y. Chen, 5722 Southwood Dr., Lake Oswego, OR (US) 97035; Michael C. Brouhard, 620 Atwater Rd., Lake Oswego, OR (US) 97034; John Wilson, 19 Kelsey Avenue, Wokingham (GB), R940 4TZ ( * ) Notice: Subject to any disclaimer, the term of this patent is extended or adjusted under 35 U.S.C. 154(b) by 28 days.

(21) Appl. No.: 10/132,587

(22) Filed: Apr. 24, 2002

(65) Prior Publication Data
US 2003/0009658 A1 Jan. 9, 2003

Related U.S. Application Data
(60) Provisional application No. 60/298,751, filed on Jun. 16, 2001, provisional application No. 60/298,771, filed on Jun. 16, 2001, and provisional application No. 60/298,772, filed on Jun. 16, 2001.

(51) Int. Cl.[7] .............................................. G06F 17/50
(52) U.S. Cl. ............................... 716/12; 716/1; 716/5; 716/3
(58) Field of Search ...................... 716/12, 1–7, 17–18, 716/14; 703/14

(56) References Cited

U.S. PATENT DOCUMENTS

| | | | |
|---|---|---|---|
| 5,841,663 A | | 11/1998 | Sharma et al. |
| 6,102,961 A | * | 8/2000 | Lee et al. .................... 716/1 |
| 6,226,780 B1 | | 5/2001 | Bahra et al. |
| 6,269,467 B1 | * | 7/2001 | Chang et al. ................ 716/1 |
| 6,446,243 B1 | * | 9/2002 | Huang et al. ................ 716/7 |
| 6,446,251 B1 | * | 9/2002 | Gardner et al. ............ 716/18 |
| 6,536,028 B1 | * | 3/2003 | Katsioulas et al. ........ 716/17 |
| 6,578,174 B2 | * | 6/2003 | Zizzo ........................... 716/1 |
| 6,581,186 B1 | * | 6/2003 | Frost et al. ................... 716/1 |
| 2001/0049593 A1 | * | 12/2001 | Mc Connell et al. ...... 703/14 |
| 2002/0016952 A1 | | 2/2002 | Chang et al. |
| 2002/0019730 A1 | * | 2/2002 | Garner et al. .............. 703/14 |
| 2003/0004699 A1 | * | 1/2003 | Choi et al. ................. 703/14 |

FOREIGN PATENT DOCUMENTS

| | | |
|---|---|---|
| WO | WO 9942930 A | 8/1999 |
| WO | WO 0142969 A | 6/2001 |

OTHER PUBLICATIONS

"Coral–Automating the Design of Systems–on–Chip Using Cores," Proceedings of the IEEE 2000 Custom Integrated Circuits Conference. (CICC 2000). Orlando, Fl, May 21–24, 2000, IEEE Custom Integrated Circuits Conference. CICC, New York, NY: IEEE, US, vol. Conf. 22, May 21, 2000 (May 21, 2000), pp. 109–112, XP002186200. ISBN: 0–7803–5810–4.

* cited by examiner

*Primary Examiner*—Vuthe Siek
*Assistant Examiner*—Magid Y Dimyan
(74) *Attorney, Agent, or Firm*—Banner & Witcoff, Ltd.

(57) ABSTRACT

An IP package is formed with at least one of one or more components of an IP block and one or more pointers to locations where the components can be retrieved, and machine readable connectivity descriptions describing how the IP block is to be connected to include the IP block in an integrated circuit. In one embodiment, the connectivity descriptions include physical pin, implemented bus signals, handling of unimplemented bus signals, and mapping descriptions. In various embodiments, the IP package may further include one or more selected ones of customizable attribute, UI choice elements, embedded and/or diagnostic software, test vectors, supplemental generators and verification environment configuration requirement descriptions. The self-describing packaging advantageously enables an EDA tool suite to offer and facilitate selection of the IP block for a SOC design.

46 Claims, 23 Drawing Sheets

```
<IP Package Description>                                    210'
    <Basic> ~ 1202a
        - Vendor ~ 1204
        - ID ~ 1206
        - Other Basic Info ~ 1208
    </Basic> ~ 1202b
    <Bus Decoder Template> ~ 1210a
        Template name ~ 1212
    </Bus Decoder Template > ~ 1210b
    <Phy Pin Descr> ~ 1214a
        Pin name, direction, width, etc. ~ 1216
    </Phy Pin Descr> ~ 1214b
    <Bus Intrf Descr> ~ 1218a
        Name/Type, master/slave, signals implemented etc. ~ 1220
        <Bus_Parm_A resolve = "user"> ~ 1221a
            Parm name, prompt etc. ~ 1221c
        </Bus_Parm_A> ~ 1221b
        <Bus_Parm_B resolve = "dependent"> ~ 1221d
            Parm name, dependency ~ 1221f
        </Bus_Parm_B> ~ 1221e
    </Bus Intrf Descr> ~ 1218b
    <Logical Pin Descr> ~ 1222a
        Physical Pin name to Bus Signal name mapping ~ 1224
    </Logical Pin Descr> ~ 1222b
    <Customizable Attr Descr> ~ 1226a
        <HDL_Parm_A resolve = "user"> ~ 1227a
            Parm name, prompt etc. ~ 1227c
        </HDL_Parm_A> ~ 1227b
        <HDL_Parm_B resolve = "dependent"> ~ 1227d
            Parm name, dependency ~ 1227f
        </HDL_Parm_B> ~ 1227e
    </Customizable Attr Descr> ~ 1226b
```

Figure 12a

```
<Customization UI Descr> ~ 1230a
    <Choice_A> ~ 1231a                          210' (Cont'd)
        Choice Elements ~ 1231c
    </Choice_A> ~ 1231b
    <Choice_B> ~ 1231d
        Choice Elements ~ 1231f
    </Choice_B> ~ 1231e
</Customization UI Descr> ~ 1230b
<Software Descr> ~ 1232a
    <SW_Part_A> ~ 1233a
        Purpose, Parm (resolve = user/dependent), etc. ~ 1233c
    </SW_Part_A> ~ 1233b
    <SW_Part_B> ~ 1233d
        Purpose, Parm (resolve = user/dependent), etc. ~ 1233f
    </SW_Part_B> ~ 1233e
</Software Descr> ~ 1232b
<Vendor Supplied Generator Descr> ~ 1234a
    <Vdr_Gen_A> ~ 1235a
        Purpose, Design/Verification Phase, etc. ~ 1235c
    </Vdr_Gen_A > ~ 1235b
    <Vdr_Gen_B> ~ 1235d
        Purpose, Design/Verification Phase, etc. ~ 1235f
    </Vdr_Gen_B> ~ 1235e
</Vendor Supplied Generator Descr> ~ 1234b
<DV Environment Config Descr> ~ 1236a
    <DV_Env_A> ~ 1237a
        Env ID, Attr/Parm, Attr/Parm Value, etc. ~ 1237c
    </DV_Env _A > ~ 1237b
    <DV_Env_B> ~ 1237d
        Env ID, Attr/Parm, Attr/Parm Value, etc. ~ 1237f
    </DV_Env_B > ~ 1237e
</DV Phase Config Descr> ~ 1236b
```

Other Descriptions/Specifications

`</IP Package>`

| IP Package ID ~ 1412 | Basic Info ~ 1414 | Bus Decoder Template ~ 1416 | |
|---|---|---|---|
| | Vendor, Version etc. | | |
| | | | |

1420

| IP Package ID ~ 1412 | HW Parts ~ 1422 | Customizable Parameters ~ 1424 |
|---|---|---|
| | Pointers or Filenames | |
| | | |

1430

| IP Package ID ~ 1412 | SW Parts ~ 1432 | Customizable Parameters ~ 1434 |
|---|---|---|
| | Pointers or Filenames | |
| | | |

1440

| IP Package ID ~ 1412 | UI Elements ~ 1442 | |
|---|---|---|
| | | |
| | | |

| IP Package ID ~ 1412 | Physical Pins ~ 1452 | Logic Pins ~ 1454 |
|---|---|---|
| | | |
| | | |

1460

| IP Package ID ~ 1412 | Bus Int ~ 1462 | |
|---|---|---|
| | | |
| | | |

1470

| IP Package ID ~ 1412 | Test Vector (Info) Parts ~ 1472 | |
|---|---|---|
| | Pointers or Filenames | |
| | | |

1480

| IP Package ID ~ 1412 | Generators ~ 1482 | Design/Verification Phase ~ 1484 |
|---|---|---|
| | Pointers or Filenames | |
| | | |

Figure 14b

SELF-DESCRIBING IP PACKAGE FOR ENHANCED PLATFORM BASED SOC DESIGN

RELATED APPLICATION

The present invention claims priority to provisional applications Nos. 60/298,751, 60/298,771, 60,298,772, entitled "Platform Based Design", "Quick Connect", and "Generator" respectively, filed on Jun. 16, 2001. The corresponding specifications are hereby fully incorporated by reference.

FIELD OF THE INVENTION

The present invention relates to the field of electronic data processing and electronic design automation (EDA). More specifically, the present invention is related to EDA tools and methodologies associated with design of systems on chip (SOC), and their verification.

BACKGROUND OF THE INVENTION

Continued advances in integrated circuit (IC) technology have brought about a tremendous increase in useable space on an IC. In order to fully utilize this space, while keeping costs down, the required per capita output for a given designer on a design team has increased dramatically. As designers' output progressed from the 10s of gates per day in the 1980s to the 100s of gates per day in the 1990s, several technologies such as synthesis facilitated this growth in productivity. By designing at a hardware description language level instead of a gate level, designers were able to increase productivity to maintain utilization of the increase in available gate capacity.

FIG. 1 shows a typical prior art high-level design process for integrated circuit design. The architecture of an Application Specific Integrated Circuit (ASIC) 110 is determined. From this architecture, a Register Transfer Level (RTL) 120 module of the design is developed. Concurrent with the RTL design, test vectors 130 are developed from the architecture to provide the designer with the ability to verify the functionality of the RTL model through RTL verification 140.

Advances in IC technology are expected to continue, resulting in further growth in the number of gates includable in an IC. Future designs will grow to require that designers' productivity to reach the millions of gates per day in the not too distant future. Increasingly, designers are putting an entire system in an IC, known as system on chip or SOC. The concept of re-useable intellectual property (IP) or components has emerged to facilitate designers in designing SOC, using existing IP (components) for the "standard" function blocks (such as the compute core, the system bus, memory and the like). However, while various disjointed design automation tools are available to assist the designers, in general, the design process for designing a SOC has remained a very labor intensive effort, requiring a designer to undertake many of the integration tasks to put together a SOC.

Recently, a number of semiconductor manufacturers, such as Oki Semiconductor of Sunnyvale, Calif., Altera of San Jose, Calif., and ARM of Cambridge, United Kingdom, have introduced or announced the intention to introduce additional tools to further assist designers of SOC. However, it is apparent that the current paradigm for designing a SOC remains insufficient to allow design teams to operate at that required level of productivity for future SOC designs. As a result, an improved, more automated and more efficient SOC design process is desired.

GLOSSARY

| | |
|---|---|
| API | Application Programming Interface |
| ASIC | Application Specific Integrated Circuit |
| EDA | Electronic Design Automation |
| GUI | Graphical User Interface |
| HDL | Hardware Description Language |
| HTML | Hypertext Markup Language |
| IC | Integrated Circuit |
| IP | Intellectual Property, re-useable components |
| PBSD | Platform Based SOC Design |
| SOC | System on Chip |
| XML | Extended Mark Up Language |

The terms "customization" and "configuration" as used herein are generally interchangeable. Each term may include the conventional meaning of the other, unless the context of the usage dictates otherwise.

The term "bus" as used herein refers to a collection of signals that implement a data transfer and/or control protocol, and/or "wires" over which the collection of signals are transferred. These signals may include interrupt signals.

The terms "masters" or "master devices" refer to devices connected to a bus that can initiate a data/control operation; and the terms "slaves" or "slave devices" refer to devices connected to a bus that can only respond to data/control operations.

The term "generator" as used herein refers to a collection of programming instructions that take a collection of design information of a SOC as input, process the design information, and output the design information of the SOC in a transformed and/or expanded state to further the design and/or verification of the design of the SOC.

The terms "verification" and "debugging" (in the enumerated as well as related forms) as used herein are generally interchangeable. Each term may include the conventional meaning of the other, unless the context of the usage dictates otherwise.

BRIEF DESCRIPTION OF THE DRAWINGS

FIGS. 3a–3b illustrate PBSD, including a base and at least two peripheral layers, in further details, in accordance with one embodiment.

FIGS. 12a–12b illustrate an IP package description in further detail, in accordance with one embodiment.

FIGS. 14a–14b illustrate a database organization suitable for use to practice the present invention.

DETAILED DESCRIPTION OF THE INVENTION

The present invention includes a novel architecture in constituting IP packages, and enhanced functions provided to a EDA tool suite to facilitate a designer in designing and/or verifying SOC, using IP provided by a multitude of vendors, in a more efficient manner. These enhanced functions include, but are but not limited to, the ability to decode bus descriptions of IP packages to facilitate expanded provision of IP available for selection, the ability to decode customizable attribute description and automatically facilitate collection customization inputs for these attributes, and the ability to control selective generation of various design and related files, such as verification environment configuration script files.

In the description to follow, various aspects of the present invention will be described. For purposes of explanation; specific numbers, materials and configurations are set forth in order to provide a thorough understanding of the present invention. However, the present invention may be practiced without some of these details. Similarly, the use of section headings is merely to assist in the understanding of the present invention. They are not to be construed as imposing any particular organization limitations on the present invention. In some instances, well-known features are omitted or simplified in order not to obscure the present invention.

Various operations will be described as multiple discrete steps, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
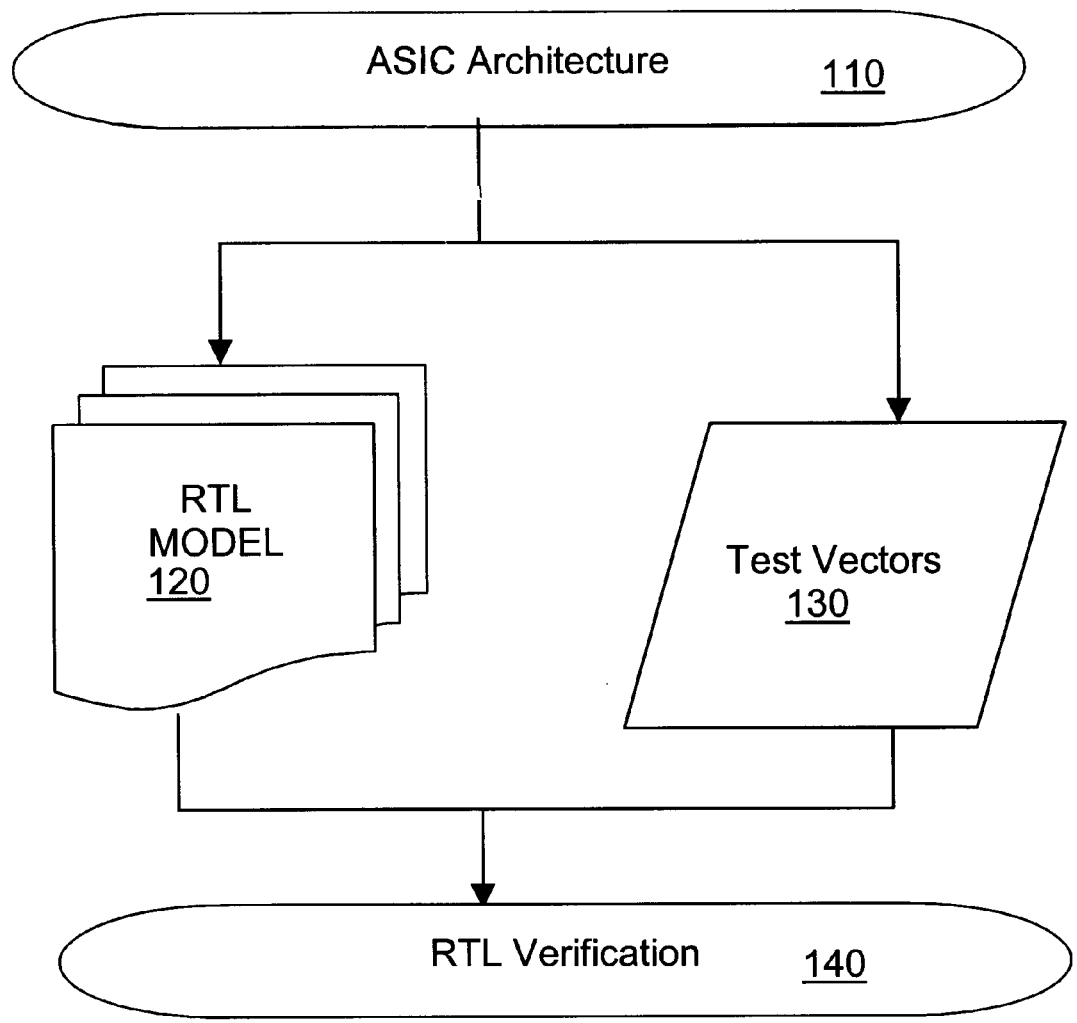
FIG. 1 illustrates prior art integrated circuit design paradigm.
Figure 2:
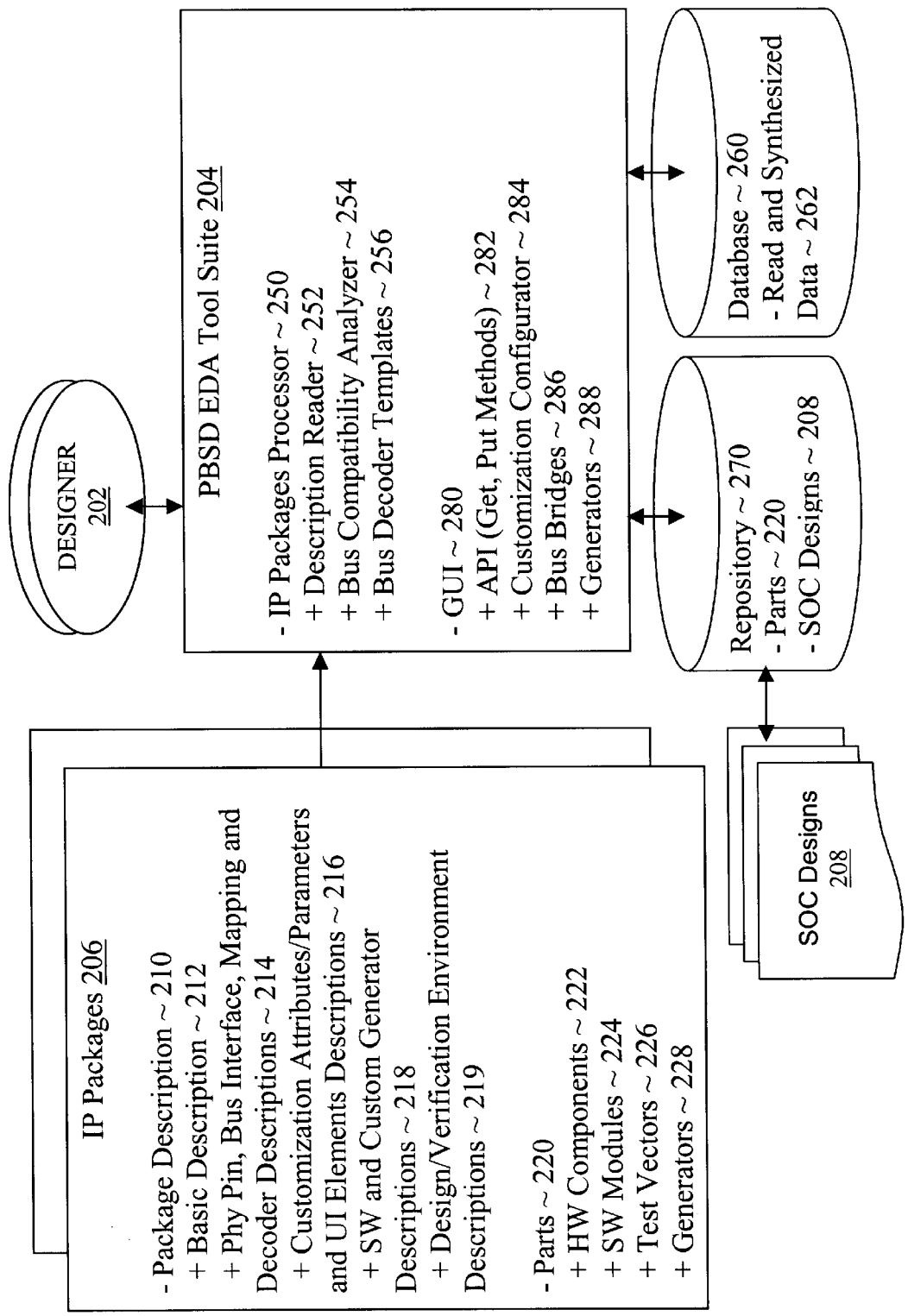
FIG. 2 illustrates an overview of the present invention, including IP packages and a PBSD EDA tool suite incorporated with the teachings of the present invention, in accordance with one embodiment.

Referring first to FIG. 2, wherein a block diagram illustrating an overview of the present invention, in accordance with one embodiment, is shown. As illustrated, the present invention includes IP packages 206 constituted in accordance with the teachings of the present invention, and PBSD EDA Tool Suite 204 incorporated with functions and elements provided in accordance with the teachings of the present invention, to enable designers 202 to efficiently select and employ the IP of IP packages 206 to form SOC designs 208, and/or to verify SOC designs 208.

As will be readily apparent from the description to follow, the present invention advantageously alleviates both the IP providers and designers 202 from much of the integration tasks, thereby expanding the IP available for selection and usage by designers 202, as well as improving the productivity of both the IP providers and designers 202.

As illustrated, for the embodiment, IP package 206 includes package description 210 and its constituting parts 220 (or pointers/links to these parts 220). Package description 210 includes basic description 212 providing basic information about the IP. Examples of basic information include but are not limited to the vendor identifier, the version level of the IP and so forth.

Further, package description 210 includes pins and bus related descriptions 214 (also referred to as connectivity information) providing physical and logical pin descriptions as well as bus implementation and decoding information to PBSD EDA Tool Suite 204, to enable Tool Suite 204 to discern bus compatibility and connectivity for the IP. Physical pin descriptions describe the physical pins of the IP, whereas bus implementation information describes implemented bus signals of known bus or bus standards. Logical pin descriptions describe mapping of the physical pins to the implemented bus signals.

Bus decoding information may also describe disposition or handling of unimplemented bus signals of the known bus or bus standard. The unimplemented bus signals may or may not optional. Alternatively, bus decoding information may reference one of bus decoder templates 256 of PBSD EDA Tool Suite 204 instead. As will be described in more detail below, PBSD EDA Tool Suite 204 is endowed with a number of bus decoder templates 256 having defaulted disposition or handling of unimplemented bus signals of various known bus or bus standards. Resultantly, specification of bus decoder description 214 may be streamlined.

The contemplated pin and bus related information 214 enables PBSD EDA Tool Suite 204 (more specifically, bus compatibility analyzer 254 of IP package processor 250) to make bus compatibility and connectivity discernment. As will be described in more detail below, in one embodiment, bus compatibility analyzer 254 makes the determination in view of the availability of various bus bridges 286, which are designed to bridge buses of a first plurality of types to buses of a second plurality of types, e.g. an AMBRA bus to a PCI bus. Resultantly, greater precision as well as attachment flexibility for a wider array of peripherals may be facilitated.

Continuing to refer to FIG. 2, for the embodiment, package description 210 also preferably includes customizable attribute or parameter descriptions and/or customizable user interface (UI) element descriptions 216. Customizable attribute or parameter descriptions 216 describe IP attributes or parameters of hardware components 222 that are customizable, e.g. memory sizes, address sizes, and so forth. Customization UI element descriptions 216 describe certain pre-defined choices to be offered to a designer 202, when facilitating the designer 202 in specifying a choice for a customizable attribute or parameter of a hardware component 222, e.g. for a timer configuration choice, the choices of "true" or "false", and the corresponding prompt texts of "enabled" or "disabled", for facilitating a designer 202 in enabling or disabling a timer feature of the IP.

As will be described in more detail below, Tool Suite 204 (more specifically, customization configurator 284 of GUI 280) automatically facilitates collection of customization inputs for the described customizable attributes or parameters, whenever the IP is selected by a designer 202.

For the embodiment, IP package description 210 may also include descriptions 218 describing embedded and/or diagnostic software 224, test vectors 226 as well as any supplemental generators 228 provided by the vendor of the IP package. Embedded software 224 may be any IP vendor provided software, such as boot code, to be used with the IP; whereas diagnostic software 224 and test vectors 226 may be any IP vendor provided test software and test data to be used for debugging or testing an inclusion of the IP with a SOC design 208.

Recall from the Glossary Section that a generator is a collection of programming instructions that take a collection of design information of a SOC as input, process the design information, and outputs the design information of the SOC in a transformed and/or expanded state to further the design and/or verification of the design of the SOC. As will be described in more detail below, the present invention contemplates that the design process comprises a number of design and/or verification phases. For example, in one embodiment, these design and/or verification phases include an IP generation phase, a hardware logic simulation generation phase, a software generation phase, and a verification environment configuration generation phase. Tool Suite 204 provides one or more generators 288 for each of these phases, to transform selected design information in each of these phases, to a new modified or transformed state at the end of the phase. Examples of these transformations, as will be explained in more detail below, may include generation of the top level description of the SOC, hardware logic for simulating the SOC, embedded or diagnostic software, and/or configuration script files for various verification environments.

An example of a hardware simulation environment is the ModelSim Tool, available from Mentor Graphics Corporation of Wilsonville, Oreg. An example of a debugging environment is the XRAY Debugging Tool, whereas an example of a co-verification environment is the Seamless Verification Tool Suite. Both are also available from Mentor Graphics.

For the embodiment, IP parts 220 may also include IP vendor supplied generators 228 to supplement the "standard" generation processing provided by generators 288 of Tool Suite 204. For example, IP vendor supplied generators 228 may be provided to perform certain processing unique to the vendor's IP, otherwise not provided by generators 288 of Tool Suite 204. In one embodiment, IP vendor supplied generators 228 are also design/verification phase based. That is, IP vendor supplied generators 228 are designated for execution in particular design/verification phases.

In one embodiment, the various design and/or verification phases are considered to be order dependent, and generators 228/288 designated for execution in an "earlier" phase are executed before generators 228/288 designated for execution in a "later" phase. For the embodiment, generators 228/288 designated for execution in one phase may be executed in any order within the phase. In alternate embodiments, other arrangements may be employed to manage order or dependency.

Further, as will be described in more detail below, generators 228/288 of the various phases may be successively invoked in selected combination, depending on the interest or need of designer 202. For examples, in one situation, a designer 202 may elect to invoke generators 228/288 of one phase, such as the design generation phase only, or the verification environment configuration script file generation phase. In yet other situations, a designer 202 may elect to invoke generators 228/288 of two phases, such as the design generation and simulation hardware logic generation phases, or the embedded software generation and verification environment script generations phases. In general, as will be described in more detail below, generators 228/288 may be successively invoked as a "chain" to transform design information of a SOC design for one or more phases; and the invocation may start at any design/verification phase, and end in any design/verification phase.

Note that the input design information for a subsequent invoked generator 228/288 may or may not be the output design information of the immediately preceding generator 228/288, regardless whether the generators 228/288 are invoked for the same design/verification phase or two successive design/verification phases. In other words, two generators 228/288 of the same or different phases may be successively invoked to transform design information, with the output of the first generator 228/288 being provided to the second generator 228/288 as input, or the two generators 228/288 may be successively invoked to perform related, but not directly coupled processing.

Continuing to refer to FIG. 2, constituting parts 220 include the various elements that actually form the IP or support the IP. That is, constituting parts 220 may include, for example, hardware components 222 of the IP, embedded software 224, if any, test vectors 226, if any, and supplemental generators 228, if any. In various embodiments, in lieu of the actual parts themselves, constituting parts 220 may contain pointers or links to storage locations from where the particular parts may be retrieved.

The exact content of each of hardware components 222, embedded or diagnostic software 224, test vector or information to generate test vectors 226, and supplemental generator 228, are dependent on the content or exact nature of the IP. Likewise, the exact content of various descriptions, pin and bus related descriptions 214, customizable attribute/parameter and UI element descriptions 216, embedded/diagnostic software and supplemental generator 218, and design/verification environment descriptions 219 are also dependent on the content or exact nature of the IP. However, one embodiment for conveying these descriptions will be described in more details below.

Still referring to FIG. 2, for the embodiment, PBSD EDA Tool Suite 204 as alluded to earlier, includes IP package processor 250 and GUI 280. IP package processor 250 is employed to process or acquire IP packages 206 constituted in accordance with the teachings of the present invention. GUI 280, including UI elements and support logic, is employed to facilitate a designer 202 in selecting various IP in the formation and design of a SOC, as well as generating the design 208 or configuring various verification environments to verify the design 208.

For the embodiment, IP package processor 250 includes in particular description reader 252 and bus compatibility analyzer 254, which includes in particular, the earlier described bus decoder templates 256.

Description reader 252 provided for the reading of package description 210 of IP packages 206, processes the descriptions, and stores the information read in database 260. Bus compatibility analyzer 254, as described earlier, is provided for the automatic determination of the IP's bus compatibility, i.e. connectivity, based on the pin and bus related descriptions 214 provided, bus decoder templates 256, if referenced, and in view of the availability of various bus bridges 286. Similarly, bus compatibility analyzer 254 stores any derived or synthesized information in database 260.

GUI 280, for the embodiment, includes an object-oriented API 282 having a number of Put and Get Methods to facilitate in the storing and retrieval of read and synthesized data 262 from database 260, as well as the storing and retrieval of imported parts 220 of IP packages 206, generated SOC designs 208 and related files, such as configuration scripts and so forth.

For the embodiment, GUI 280 also includes customization configurator 284 provided to facilitate a designer 202 in specifying the customizable or configurable attributes or parameters of the selected IP. As will be described in more detail below, in response to the selection of an IP, customization configurator 284 (e.g. applicable Put and Get Methods of API 282) retrieves the customizable/configurable attributes/parameters of the IP, including UI choices elements, if any, and dynamically generates as well as presents the dynamically generated customizable forms to a designer 202 to collect customization/configuration specifications for the customizable/configurable attributes/parameters of the selected IP.

Bus bridges 286, as alluded to earlier, are pre-provided bus interfaces that bridge between compatible buses to broaden the amount of IP available for selection to a SOC designer 202. For example, by pre-providing a bridge between bus architectures A and B, an IP determined to support bus architecture B may nevertheless be offered for selection, even though a SOC designer 202 has decided (explicitly or implicitly) to employ bus A, as the IP may be attached to bus A via the pre-provided bus bridge bridging bus architectures A and B.

Generators 288, as described earlier, are provided to transform SOC designs 208 at various phases of the design and/or verification process. As will be described in more detail below, generators 288 designated for execution in the various phases of the design and/or verification process are invoked in selected combination in a chained manner, depending on the interest or request of a designer 202.

As will be described in more detail below, through GUI 280, a designer 202, in one instance, may select various IPs to form a SOC, and request the SOC, the hardware logic for simulation, the embedded and diagnostic software, and the verification environment configuration script files be generated. Depending on the selection and specification, e.g. the simulation tool to be employed, appropriate ones of generators 288 are invoked in sequence, forming a chain of generators 288, to perform the various generations, i.e. transformation of design data, to accomplish the various generations for the designer 202. In other instances, the designer 202 may request only a subset of these generations, e.g. through hardware logic generation only, or verification environment configuration script generation only, to be performed.

Database 260 and repository 262 may be implemented using any storage subsystems known in the art. One embodiment of a data organization suitable for use to store the various relevant information to practice the present invention is later described.

API 282 may be implemented using any one or a number of programming techniques known in the art. In one embodiment, the API functions are implemented as Methods using the Java Programming Language, and associated with various data objects. In alternate embodiments, other programming languages and/or techniques may be employed instead.

One embodiment each of IP package processor 250, including bus description reader 252, bus compatibility analyzer 254, and GUI 280, including customization configurator 284, and generators 288, will also be described in more detail in turn below.

Bus decoder templates 256 and bus bridges 286 are bus dependent. Similarly, Put and Get Methods of API 282 are data organization dependent. Implementation of these elements is within the ability of those ordinarily skilled in the art; accordingly, they will not be further described.

Note that while the description thus far has described IP packages 206 as re-useable IP provided by IP providers, it will be appreciated by those ordinarily skilled in the art that application specific logic of a targeted SOC design may be likewise incorporated in like manner, using Tool Suite 204, as any of the re-useable IP supplied by IP providers.

IP Package & Acquisition Process

Having now given an overview description of the various aspects of the present invention, we turn now to describe IP package 206 in further detail, including the process of processing or acquiring IP packages 206 for incorporation into a design environment for use by designers 202.

As alluded to by earlier description, in accordance with the present invention, each IP package 206 is advantageously self-describing. FIGS. 12a–12b illustrate an IP package description 210' including basic, pin, bus related, customizable attributes/parameters, and other descriptions, in accordance with one embodiment. For the embodiment, description 210' is expressed using a XML-like Language having XML like language tags defined in accordance with a schema of a namespace associated with Tool Suite 204. As is well known, XML is a "self-describing" language, and thus is particularly suitable for describing the various aspects of an IP. However, in alternate embodiments, other "description" techniques may be practiced instead.

As illustrated, exemplary IP package description 210' includes basic descriptions 1204–1208 delineated by basic description tag pairs 1202a and 1202b, bus decoding template 1212 delineated by bus decoding template tag pairs 1210a and 1210b, physical pin descriptions 1216 delineated by physical pin description tag pairs 1214a and 1214b, bus interface descriptions 1220 and 1221 delineated by bus interface description tag pairs 1218a and 1218b, and logical pin descriptions 1224 delineated by logical pin description tag pairs 1222a and 1222b.

Exemplary IP package description 210' also includes customizable attribute descriptions 1227 delineated by customizable attribute description tag pairs 1226a and 1226b, customization UI element descriptions 1231 delineated by customizable attribute description tag pairs 1230a and 1230b, software descriptions 1233 delineated by software description tag pairs 1232a and 1232b, vendor supplied generator descriptions 1235 delineated by vendor supplied generator description tag pairs 1234a and 1234b, and design/verification environment configuration descriptions 1237 delineated by design/verification environment configuration description tag pairs 1236a and 1236b.

As described earlier, basic descriptions 1204–1208 set forth between basic description tags 1202a and 1202b may include e.g. vendor and package identification information 1204–1206 as well as other basic information 1208, such as number of files, the file sizes, and so forth. Bus decoding template 1212 set forth between bus decoding template tags 1210a and 1210b may include e.g. a reference to a bus decoder template 1212 provided by Tool Suite 204. Physical pin descriptions 1216 set forth between physical pin description tags 1214a and 1214b may include e.g. the pin names, their directions, their width, and so forth 1216. Bus interface descriptions 1220 set forth between bus interface description tags 1218*a* and 1218*b* may include e.g. the bus or bus standard name, whether the IP component is to behave as a master or a slave device, enumeration of the signals implemented, and so forth 1220. For the embodiment, bus interface description 1221 delineated may also include a number of bus parameters to be resolved based directly or indirectly on user inputs 1221*a*–1221*c* and 1221*d*–1221*f*. The descriptions may include identification of the parameters, the manner of resolution, user prompts and so forth. Logical pin descriptions 1224 set forth between logical pin description tags 1222*a* and 1222*b* may include mapping 1224 of physical pins to the implemented bus signals earlier described. Together, these descriptions define how the IP may be connected to other IP or components to form a SOC design 208.

Customizable attribute or parameter descriptions 1227 set forth between customizable attribute/parameter description tags 1230*a* and 1230*b* may include e.g. a number of IP component parameters to be resolved based directly or indirectly on user inputs 1227*a*–1227*c* and 1227*d*–1227*f*. Similarly to the customizable bus interface parameters, the descriptions may include identification of the IP component parameters, the manner of resolution, user prompts and so forth. Customization UI element descriptions 1231 set forth between customization UI element description tags 1226*a* and 1226*b* may include e.g. choices for a number of choice elements 1231*a*–1231*c* and 1231*d*–1231*f*. As described earlier, examples of choices may be "enabled" or "disabled" for an included timer.

Software descriptions set forth between software description tags 1232*a* and 1232*b* may include e.g. identifications of a number of embedded or diagnostic software, including their purposes, corresponding parameters, and manner of resolution for the parameters 1233*a*–1233*c* and 1233*d*–1233*f*. Likewise, vendor supplied generator descriptions 1235 set forth between vendor supplied generator description tags 1234*a* and 1234*b* may include e.g. identifications of a number of vendor supplied generators, including their purposes, and the design and/or verification phases the generators are to be used 1235*a*–1235*c* and 1235*d*–1235*f*.

Lastly, for the embodiment, design/verification environment configuration descriptions 1237 set forth between design/verification environment configuration description tags 1236*a* and 1236*b* may include e.g. identifications of a number of design and/or verification environments, such as simulation and/or co-verification environments, corresponding parameters, their settings and alternatively, manner for resolving the parameters 1237*a*–1237*c* and 1237*d*–1237*f*.

Before proceeding to further describe the present invention, it should be noted that the employment of a XML-like language may also be practiced with more or less language tags. Defining the semantics of such XML like language tags in a schema of a namespace is within the ability of those ordinarily skilled in the art, and accordingly will not be further described.

Figure 13:
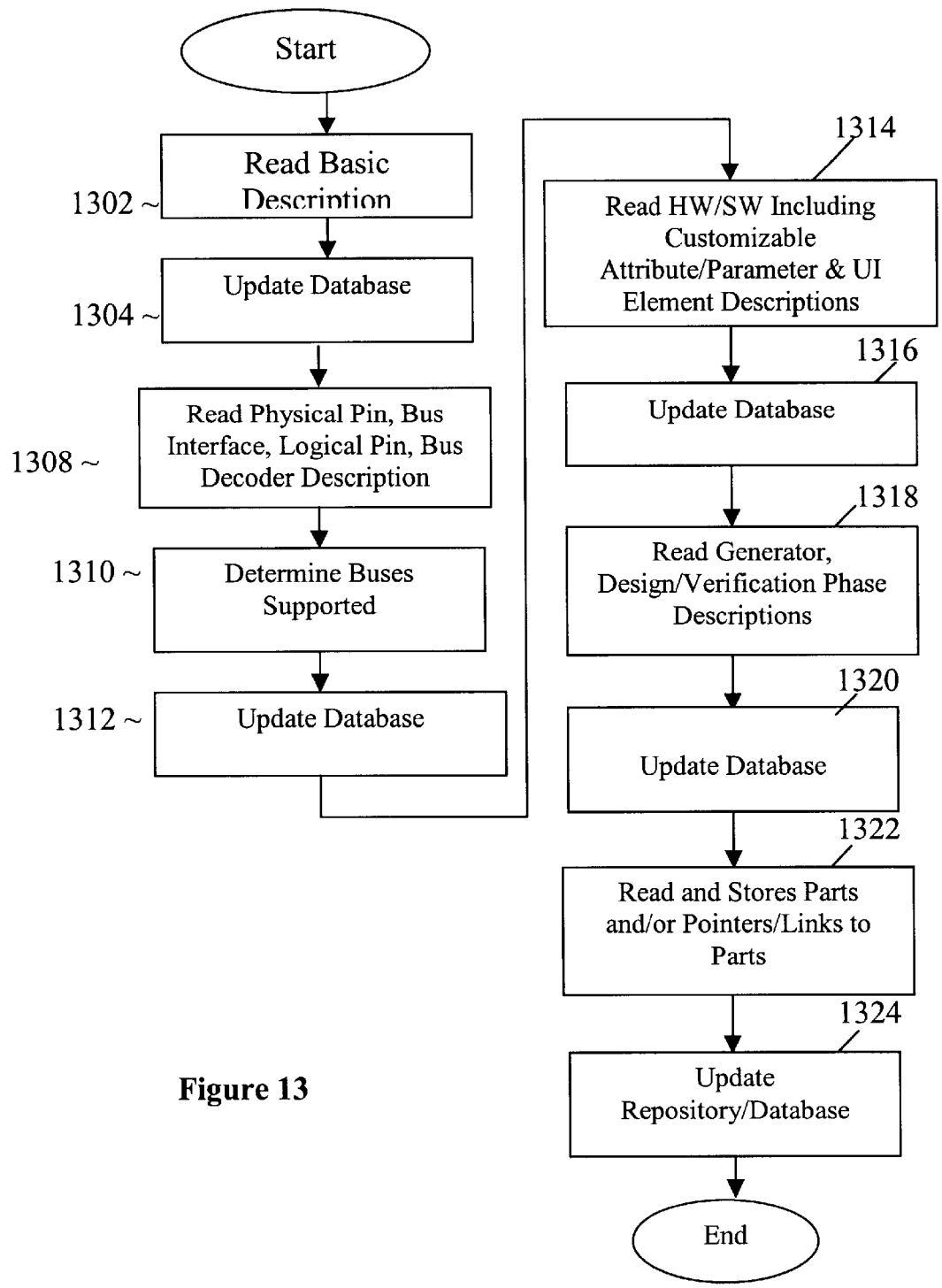
FIG. 13 illustrates the operational flow of the relevant aspects of the IP package processor of PBSD EDA Tool Suite, in accordance with one embodiment.

FIG. 13 illustrates the operational flow of the relevant aspect of IP package processor 250 (including description reader 252 and bus compatibility analyzer 254), for processing an IP package 206, and acquiring the IP into a design environment equipped with Tool Suite 204, making the IP available for use by a designer 202, in accordance with one embodiment. As illustrated, upon invocation, IP package processor 250 (more specifically, description reader 252) identifies and reads basic description 212, block 1302. Description reader 252 then stores the basic information read into corresponding data fields of database 260, block 1304.

Next, description reader 252 identifies and reads pins and bus related description 214, block 1308. Upon reading the pin and bus related description information, for the embodiment, description reader 252 invokes bus compatibility analyzer 254 to decode the provided pin and bus related information, using bus decoding information explicitly or implicitly provided. In response, bus compatibility analyzer 254 determines the bus architectures supported accordingly, including bus signals implemented, and disposition/handling of the unimplemented signals, block 1310. Upon determining the information, in like manner, bus compatibility analyzer 254 stores the supported bus architecture information, including related synthesized information, into database 260, block 1312.

Thereafter, for the illustrated embodiment, description reader 252 identifies and reads customizable attribute and UI element descriptions 216, as well as included software, including customizable parameters 218, block 1314. Upon identifying all embedded and diagnostic software, including the customizable hardware as well as software attributes for which customization inputs are to be collected, as with the earlier described operations, description reader 252 stores the information read into database 260, block 1316. Next, description reader 252 identifies and reads vendor supplied generator descriptions 218, as well as design and/or verification environment configuration descriptions 219, block 1318. Similarly, description reader 252 stores the information read into database 260, block 1320.

Next, description reader 252 identifies and stores the included parts 220, i.e. hardware components 222, embedded and/or diagnostic software 224, test vectors 226, and vendor supplied generators 228, or pointers/links to the parts, blocks 1322–1324. The actual parts 220, if present, are stored in repository 270, whereas pointers/links to the parts are stored in database 260.

FIGS. 14*a*–14*b* illustrate a data organization suitable for use to store the various extracted and/or synthesized information associated with the IP packages 206 processed, in accordance with one embodiment. As illustrated, data organization 1400 includes a number of tables/views 1410–1480. Table/view 1410 includes a column 1412 for storing an identifier for each of the IP package 206 processed, and a number of columns 1414–1416 for storing their basic information, such as vendor name, version level, and so forth, including in particular, identifications of bus decoder templates to be employed in the decoding of pin and bus related information.

Table/view 1420 includes column 1422 employed to store the pointers, links or file identifiers identifying the hardware parts of the various IP, and columns 1424 employed to store the various customizable parameters of the IP, including the manner the parameters are to be resolved.

Table/view 1430 includes column 1432 employed to store the pointers, links or file identifiers identifying the software parts of the various IP. Similarly, table/view 1430 also includes columns 1434 employed to store the various customizable parameters, including the manner the parameters are to be resolved.

Table/view 1440 includes columns 1442 employed to store information related to the various UI choice elements of the various IP, to be used in collecting user inputs for the customizable hardware/software attributes/parameters of the various IP.

Table/view 1450 includes columns 1452–1454 employed to store the physical pins and the logical pins, i.e. the corresponding implemented bus signals, of the various IP. Table/view 1460 includes columns 1462 employed to store the various information describing the bus or bus standard supported, including the bus signals implemented, and the disposition or handling of unimplemented bus signals of the various IP. In other words, tables/views 1450 and 1460 store connectivity information of the various IP.

Table/view 1470 includes column 1472 employed to store the pointers, links or file identifiers of the test vectors or information for use to generate the test vectors of the various IP. Table/view 1480 includes columns 1482 employed to store the pointers, links or file identifiers of the vendor supplied generators, and columns 1484 employed to store configuration information associated with various design and/or verification phases.

Thus, it can be seen from the above description, applying the present invention, IP of various IP vendors may be more easily made available and integrated into a design and/or verification environment, for use by designers 202 in the design of SOC.

Enhanced Platform Based SOC Design

Having now described how IP may be advantageously packaged, and how IP packages 206 may be processed and integrated into a design and/or verification environment for use by designers 202, using Tool Suite 204, to create SOC designs 208, we turn now to describe the enhanced PBSD process of the present invention.

Enhanced PBSD is a design methodology that facilitates design of a SOC through aggregation of re-useable IP in an iterative and/or layered manner, by a designer or design team (together simply referred to as "designer"). The re-use of existing intellectual property (IP) modules provides a designer with the ability to gain the functionality of the re-used IP without the need to design the functionality as part of the new design. By aggregating multiple, reusable IP modules, a designer may identify significant sections of a design in the planning stage. Thus, a significant portion of a design may be established without the need to perform many detailed design steps. Moreover, these reusable IP blocks will typically be pre-verified and the suppliers of these blocks will provide test vectors for further in-place testing of these blocks. This pre-verification can reduce even further the amount of effort required by not necessitating development of tests for these reusable IP blocks. Design and verification can consume an exorbitant amount of time; because of the pre-existence of these blocks and their pre-verification, a majority of the designers actual "design time" can be spent designing the new logic for which no IP exists and consequently reduce the overall design time.

As shown in FIG. 3a, in one embodiment, a SOC design contains at least 2 layers of design; a base platform layer 310 and a peripheral layer 320. The base platform layer 310 comprises a compute engine. Examples of a compute engine includes but are not limited to microprocessors, digital signal processor, micro-controllers, and the like. Peripheral layer 320 comprises those IP components which are required for the targeted design but which are not part of the compute engine.

Figure 3B:
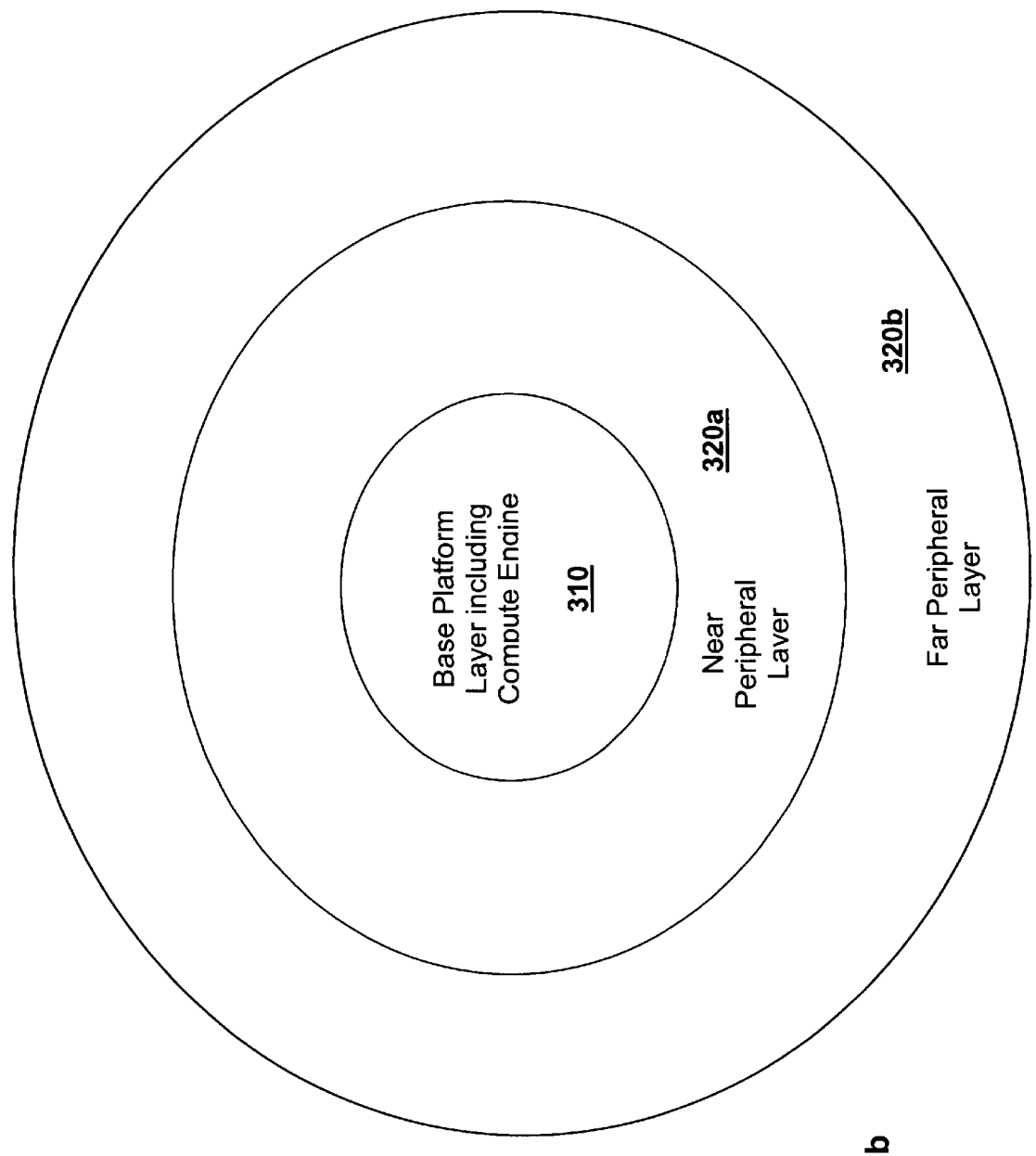

Peripheral layer 320 may actually be contained in several peripheral layers. In one embodiment, there are two peripheral layers in a SOC design. FIG. 3b shows one such embodiment where the peripheral layer is logically divided into two layers, a near peripheral layer 320a and a far peripheral layer 320b. In one embodiment, the near peripheral layer 320a contains IP that is intended to form the nucleus of the base platform design, together with the selected computing engine.

Thus, the PBSD process begins with offering a designer 202 a list of computing engines for selection. In response to such offer, designer 202 selects a compute engine. This selected compute engine will be at the core of the design.

Next, the main system components that support the operation of the compute engine are to be chosen. These main system components combined with the compute engine form a nucleus of the IC design. For example, in one embodiment of the invention, the main system components comprise flash memory, SRAM, main system bus arbiter and DMA controller.

For a given compute engine, the compute engine's I/O functionality will define a set of requirements with which the main system components, to be utilized, should be compatible. For example, in one SOC design, if an IBM PowerPC 440 processor is chosen as the compute engine, by virtue of its adoption of the CoreConnect architecture, any main system components to be interfaced with the chosen processor should necessarily support the Processor Local Bus protocol or be bridgeable to support the Processor Local Bus Protocol.

Accordingly, the bus compatibility requirement is first determined based upon the compute engine chosen for the core of the design, using the bus architecture information stored in database 260. In turn, based on the bus compatibility requirement determined, including the possibility of bridging to it based on the pre-provided bus bridges, a set of main system components is provided to designer 202, to allow designer 202 to select one or more main system components.

For example, in one SOC design, if a designer 202 chooses as an Ericsson Bluetooth ARM7TDMI processor as the compute engine, based on the bus information stored in database 260, it is first determined that ARM7TDMI supports the Advanced Microcontroller Bus Architecture (AMBA™) on chip bus specification. More specifically, since the AMBA 2.0 specification supports several buses definitions, based on the bus architecture information stored in database 260, it is further determined that the bus definition supported is a "Advanced High-Performance Bus" (AHB). This bus is a system bus that supports multi-master bus management and connects the processor to high-performance peripherals, on-chip memory and interface functions. Once the bus type is determined, all main system components that support the AMBA AHB specification will be determined, based on the information stored in database 260, and this list of main system components will be provided to the designer 202 for selection.

In alternate embodiments, Tool Suite 204 preferably also supports explicit specification or override on the bus compatibility question for the compute engine selected or solicits the assistance of designer 202 in identifying the bus architecture to be employed.

The present invention also contemplates support for SOC designs that employ a secondary bus that is not part of the nucleus of the design. Designers 202 are also able to use the features of Tool Suite 204 to add components to the SOC design that are general-purpose peripherals. General-purpose peripherals are those that do not reside on a high-speed bus. For example, in one SOC design, where a designer 202 has chosen an Ericsson Bluetooth ARM7TDMI processor supporting AMBA 2.0, the AMBA Advanced Peripheral Bus may also be chosen as the general-purpose bus for attaching other I/O peripheral devices. In a manner similar to that discussed above with respect to the AHB, a user may explicitly or implicitly choose a general-purpose bus type. With this information, a list of available peripherals components that support the Advanced Peripheral Bus is ascertained. A designer 202 may then be provided with the determined list of these available components for selection.

Figure 4:
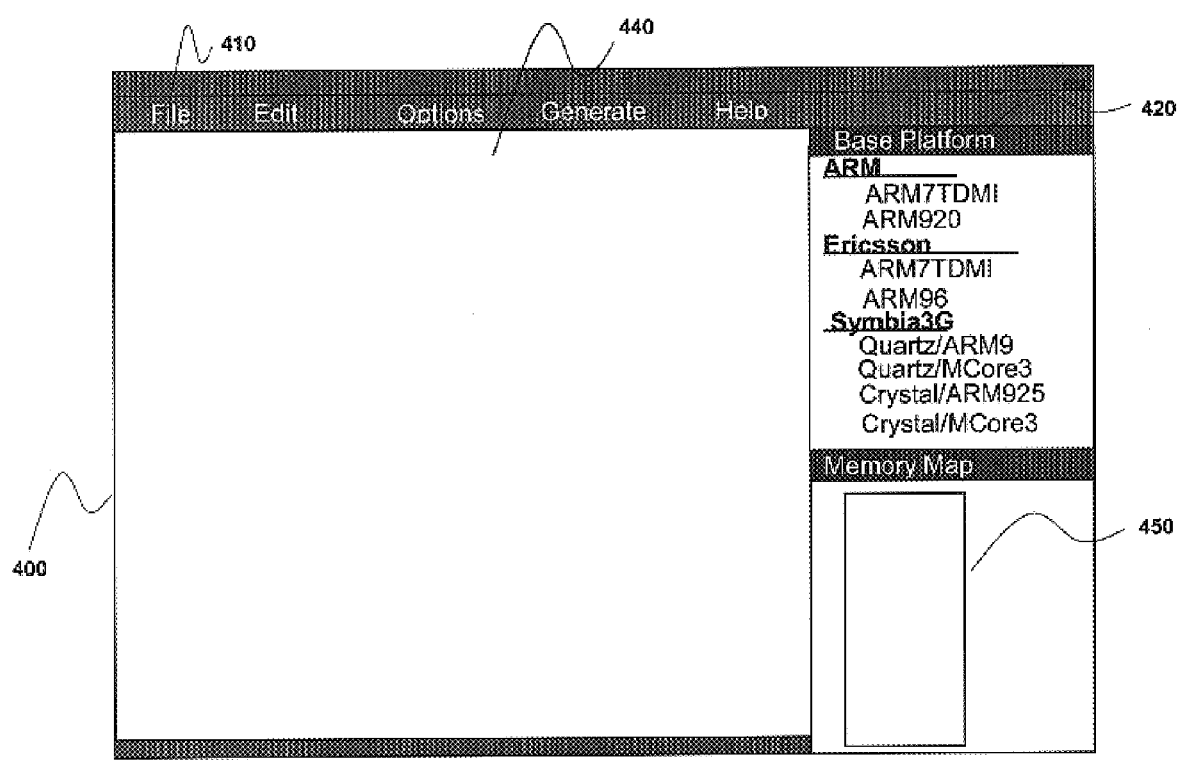
FIGS. 4–6 illustrate the GUI of PBSD EDA Tool Suite for selecting and configuring the compute engine of the base layer, in accordance with one embodiment.
Figure 5:
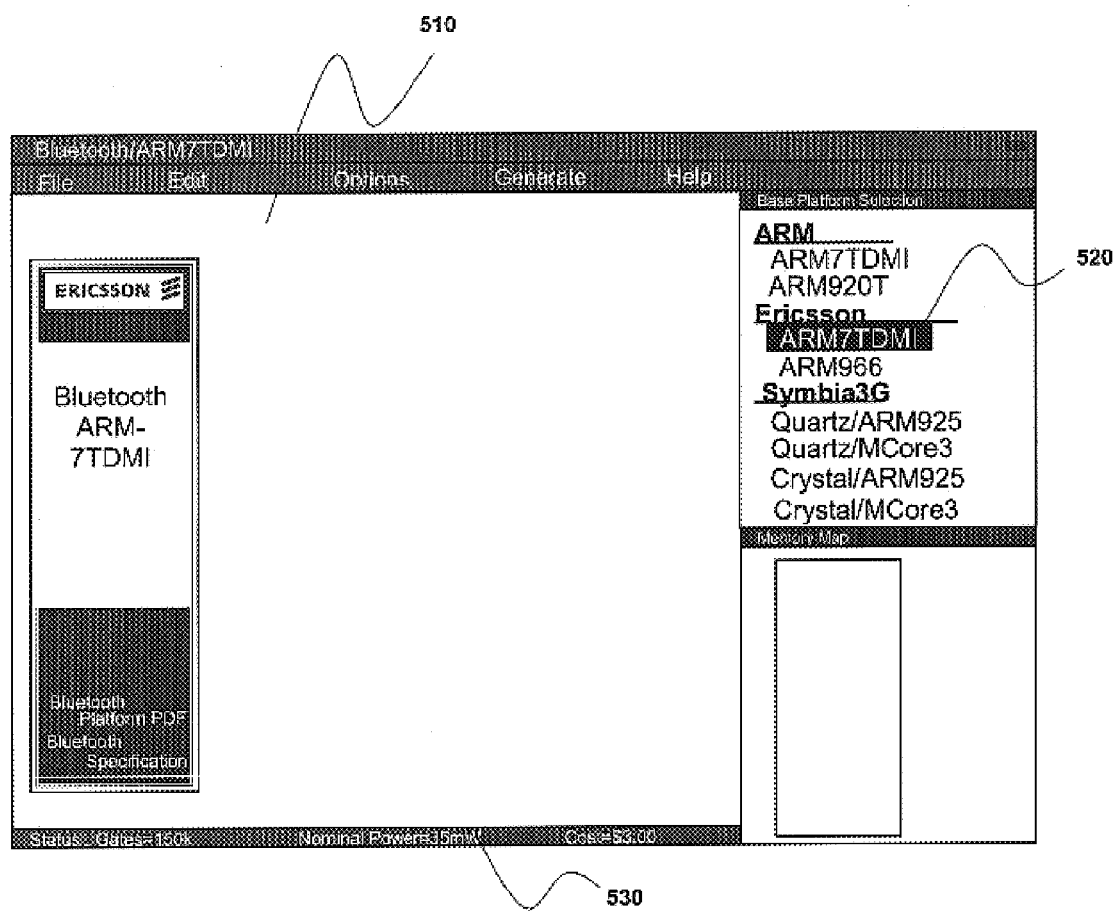
Figure 6:
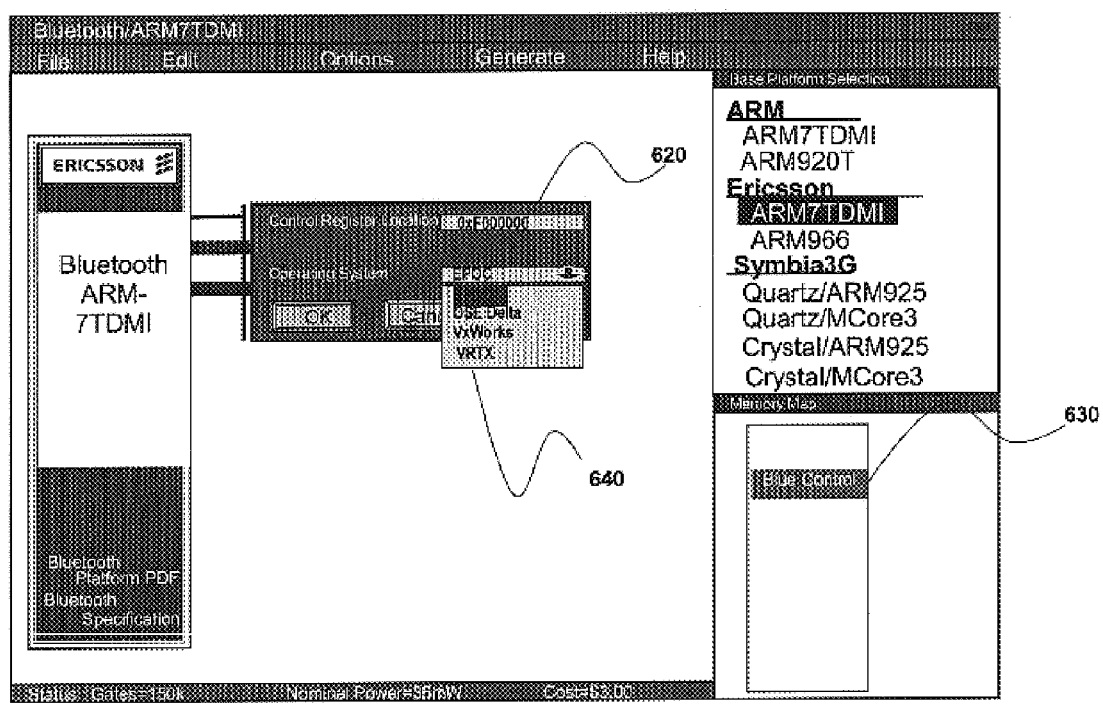

FIGS. 4–6 illustrate a GUI suitable for use to facilitate a designer 202 in selecting and configuring a compute engine of the base layer, to practice the present invention, in accordance with one embodiment. As illustrated, e.g. in FIG. 4, main window 400 of GUI 280 comprises pull down menus 410, work area 440, base platform selection area 420, and memory map display area 450. For the illustrated embodiment, the base platform selection area 420 provides a listing of core computing platforms acquired into design environment as earlier described, available for a design to select and include as part of the SOC being designed. For the embodiment, the selection is reflected in work area 440.

FIG. 5 illustrates the example result of choosing an Ericsson ARM7TDMI from the base platform selection area. Upon selecting the item, e.g. by double clicking at 520, a representation of the compute engine appears in the work area 510. In this embodiment, additional information is shown in a report area 530 at the bottom of the work area 510 of those items selected in the Base Platform Selection. The additional information available may include e.g. information on the various attributes or parameters of the selected items.

For a given base platform design, when it is selected for the SOC design, a customization/configuration menu/form appears, which prompts the designer 202 for inputs for the customizable or configurable attributes of the base platform. Recall that as part of the acquisition process, customizable attribute or parameter information and if applicable, UI element descriptions are read and stored in database 260. In response to the selection of a base platform, the customizable attribute or parameter information, including application UI element descriptions, are retrieved, and customization input forms for prompting a designer 202 to supply the attribute or parameter values are dynamically generated and presented to the designer 202 in order.

In one embodiment, the customization input forms are encoded in HTML. In alternate embodiments, other encoding or programming techniques may be practiced instead. In any case, generation of customization input forms in view of a number of attributes/parameters requiring user specification is known in art, and accordingly will not be further described.

For the example illustration, as shown in FIG. 6, the customizable attributes or parameters include the starting or base addresses of the control registers. Accordingly, an input form is dynamically generated and presented to a designer 202, to enable the designer 202 to provide the starting, or base address for a control register 620.

The embodiment shown in FIG. 6 also provides a display area wherein a memory map reflects the base address chosen for the control register 630 is reflected for the designer 202, thus advantageously allow the designer 202 to track the aggregate assignment of memory addresses.

In addition, for the illustrated embodiment, as specified by the IP package 206, the designer 202 is also prompted to select an operating system 640 for the SOC design. The list of operating systems available for selection again may be retrieved from database 260. The information are stored in database 260 based on their specifications via e.g. the earlier described UI choice elements 216 of IP package 206.

An advantage of prompting and guiding a designer 202 in configuring a selected component is to improve the ease of use of the highly complex task of selecting and configuring IP blocks. As those skilled in the art will appreciate, when a designer 202 acquires an IP block for use in a design, typically the designer 202 is required to make decisions about how to configure a device. Under the prior art, this can involve having to read a very detailed and complex data sheet. The present invention advantageously simplifies the usage of IP components greatly, by providing the ability to prompt and guide a designer 202 through the configuration. The earlier description is made simple on purpose to facilitate ease of understanding.

Figure 7:
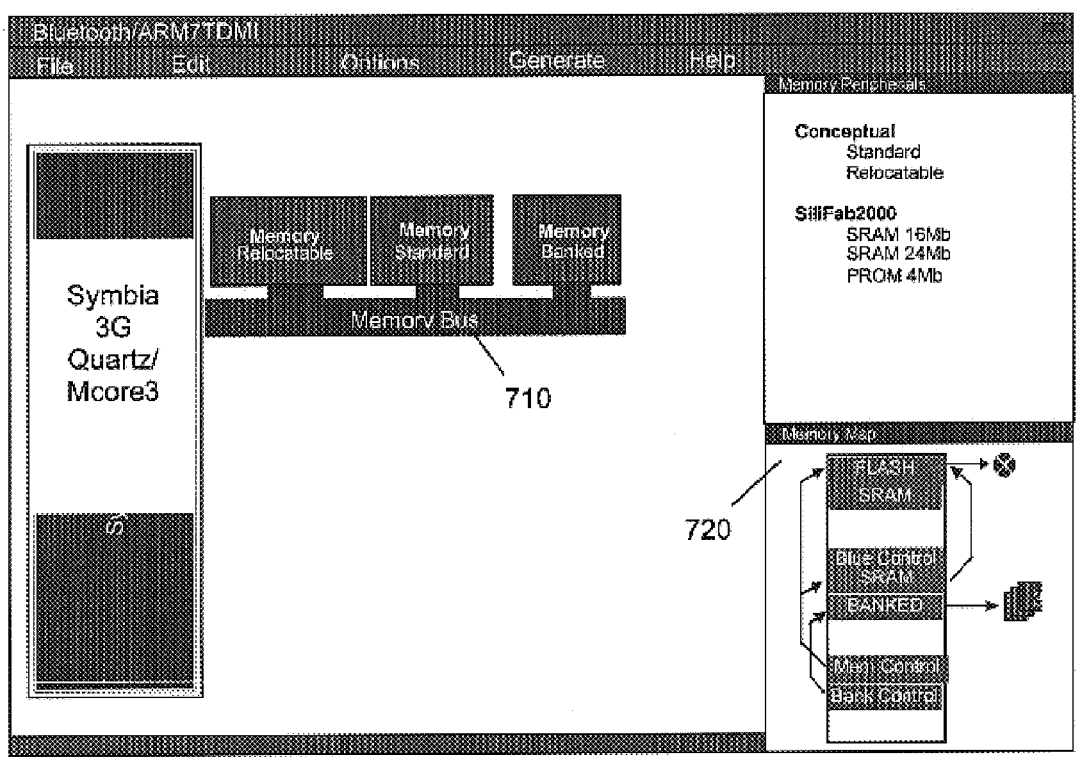
FIGS. 7–9 illustrate the GUI of PBSD EDA Tool Suite for selecting and configuring compatible peripherals of the peripheral layers, in accordance with one embodiment.
Figure 8:
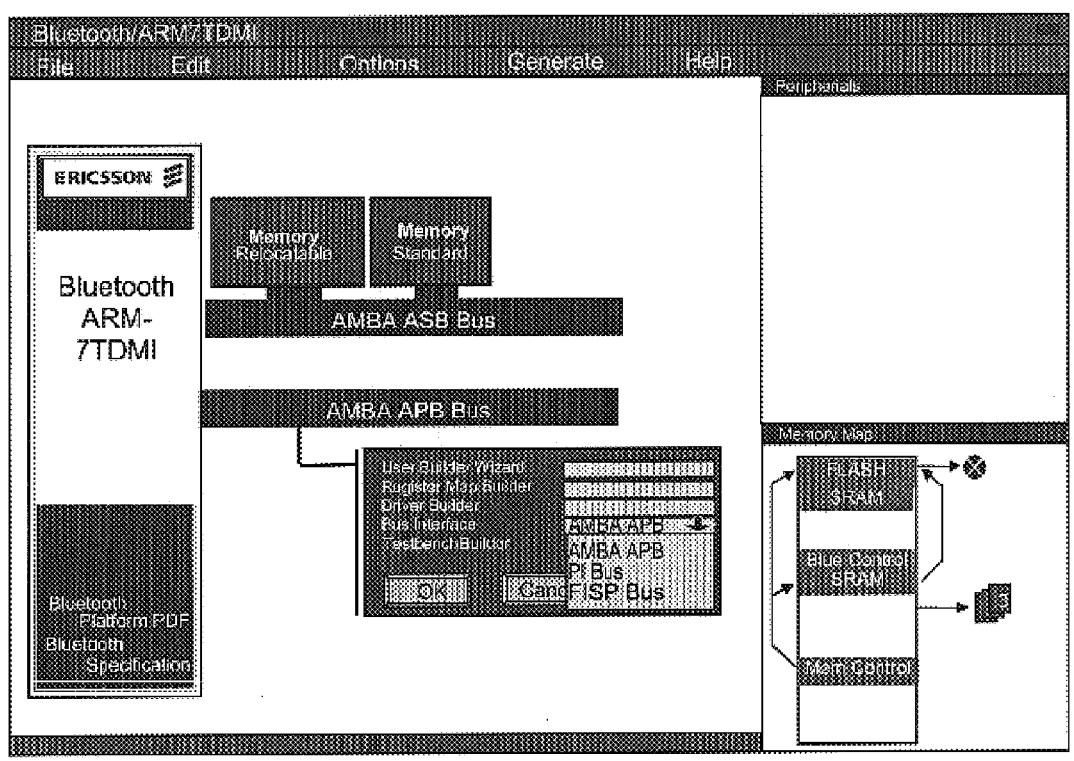
Figure 9:
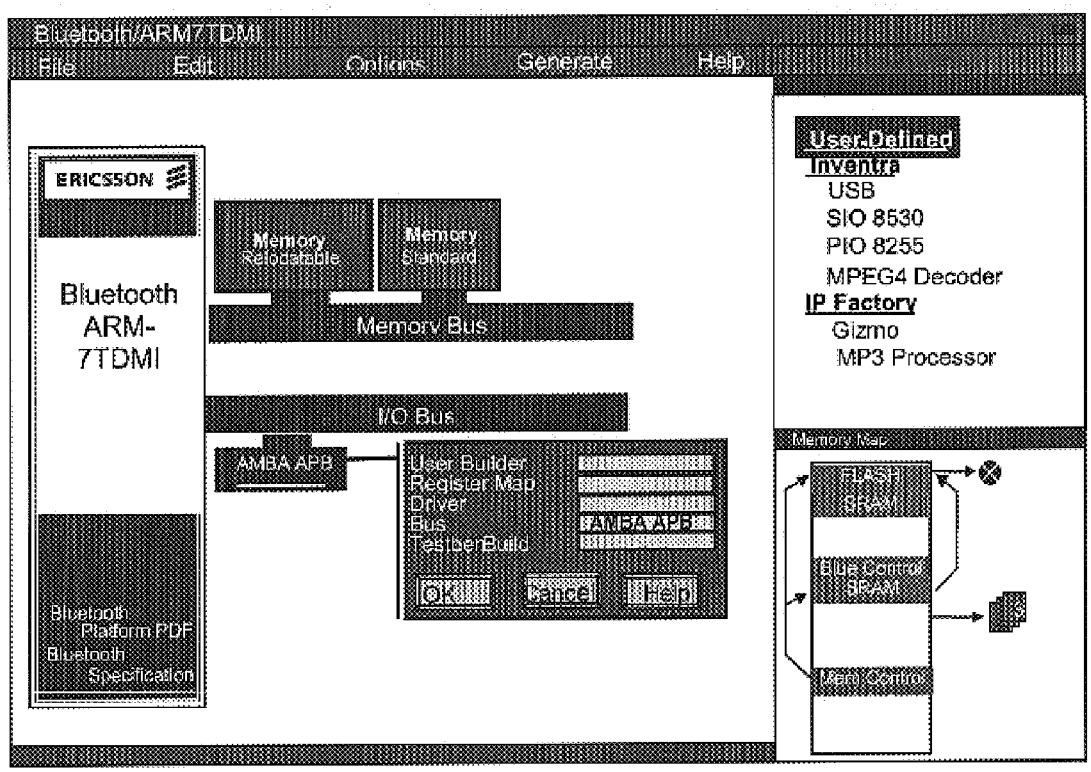

As discussed above, after the base platform has been decided upon, the designer 202 can choose from a set of peripheral devices compatible with the compute engine chosen. FIGS. 7–9 illustrate an embodiment of GUI 280 suitable for use to facilitate a designer 202 in selecting and configuring compatible peripheral devices for the peripheral layers, to practice the present invention. Note that as described earlier, the peripheral devices may include application specific logic block provided by the designer 202.

For the illustrated embodiment, as shown in FIG. 7, a designer 202 first selects the memory components to be employed from a provided list of available memory items. For the example illustration shown in FIG. 7, several memory components have been added to a memory bus. Specifically, three memory blocks have been selected/added, shown as 710. The example illustration shows the addition of relocatable, banked and standard memories to the SOC design. In addition, the location of each memory block, and their corresponding control blocks, are shown in the memory map 720.

In another example SOC design, there is a near peripheral and a far peripheral bus. Illustrated in FIG. 8 is one such example SOC design, where the near and far peripheral buses are the AMBA Advanced System Bus (ASB) and Advanced Peripheral Bus (APB) respectively. For this example SOC design, memories for the system are resident on the Advanced System Bus, and other peripherals, including the application specific logic block, are attached to the APB. For this example SOC design, the compute engine, the near and far peripheral buses, and the components attached thereto, may all be selected and configured as earlier described.

FIG. 9 shows yet another example SOC design, where the AMBA APB is not the general purpose I/O bus, but is rather a sub-bus of the general purpose I/O bus and is where AMBA compliant devices are attached. Similar to the earlier described SOC design, the compute engine, the near and far peripheral buses, and the components attached thereto, may all be selected and configured as earlier described.

Figure 15:
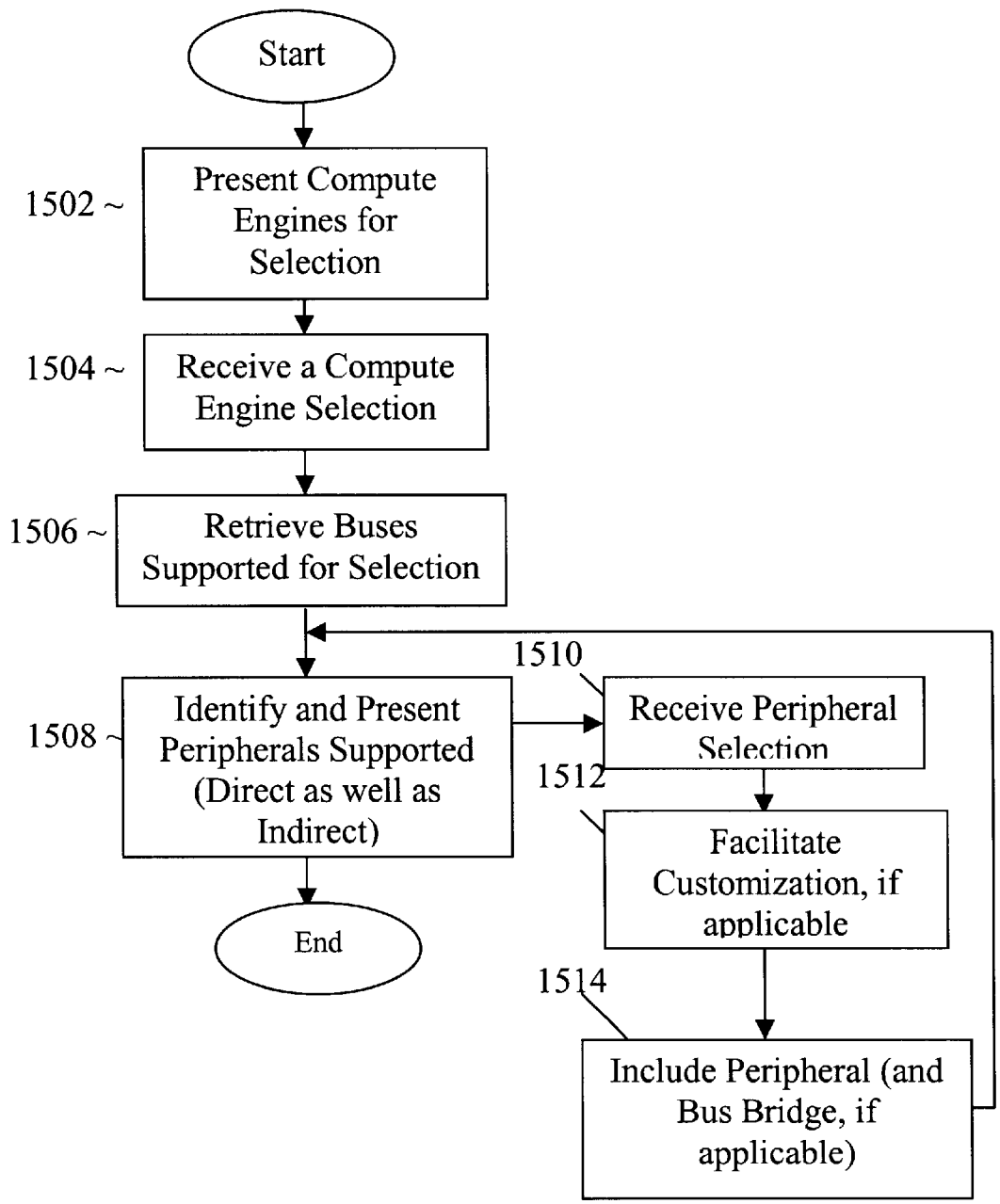
FIG. 15 illustrates the operational flow of the relevant aspect of the logic in support of the GUI of PBSD EDA Tool Suite of the present invention, in accordance with one embodiment.

FIG. 15 illustrates the operational flow of the relevant aspect of the logic of Tool Suite 204 in support of GUI 280, in accordance with one embodiment. As illustrated, upon invocation, as described earlier, in accordance with the number of computing engines acquired into the design environment, with their descriptive information and if applicable pointers/links to the parts stored in database 260 (or actually stored in repository 270), a list of compute engines is presented for a designer 202 for selection, block 1502.

Thereafter, the selection of designer 202 is received, block 1504. In response, the bus architectures supported by the selected compute engine is retrieved from database 260 and present for selection, block 1506. Upon selection, supported peripherals for the selected bus architecture, with or without the employment of bus bridges 286, are identified and presented for selection by designer 202, block 1508.

At block 1510, selection of a peripheral is received. At block 1512, customization or configuration of the selected peripheral IP is facilitated. Similar to the customizable hardware attributes or parameters, the customizable attribute or parameter information, including applicable UI choice elements, are retrieved from database 260, and customization input forms are dynamically generated and presented to the designer 202, to allow the designer 202 to specify the attribute or parameter values for the customizable attributes or parameters. Upon customization or configuration, the selected peripheral is included as part of the SOC design, block 1514.

The operations at block 1508–1514 are repeated until all selections for peripherals for each bus (e.g. the near and far peripheral buses) have been completed.

Figure 16:
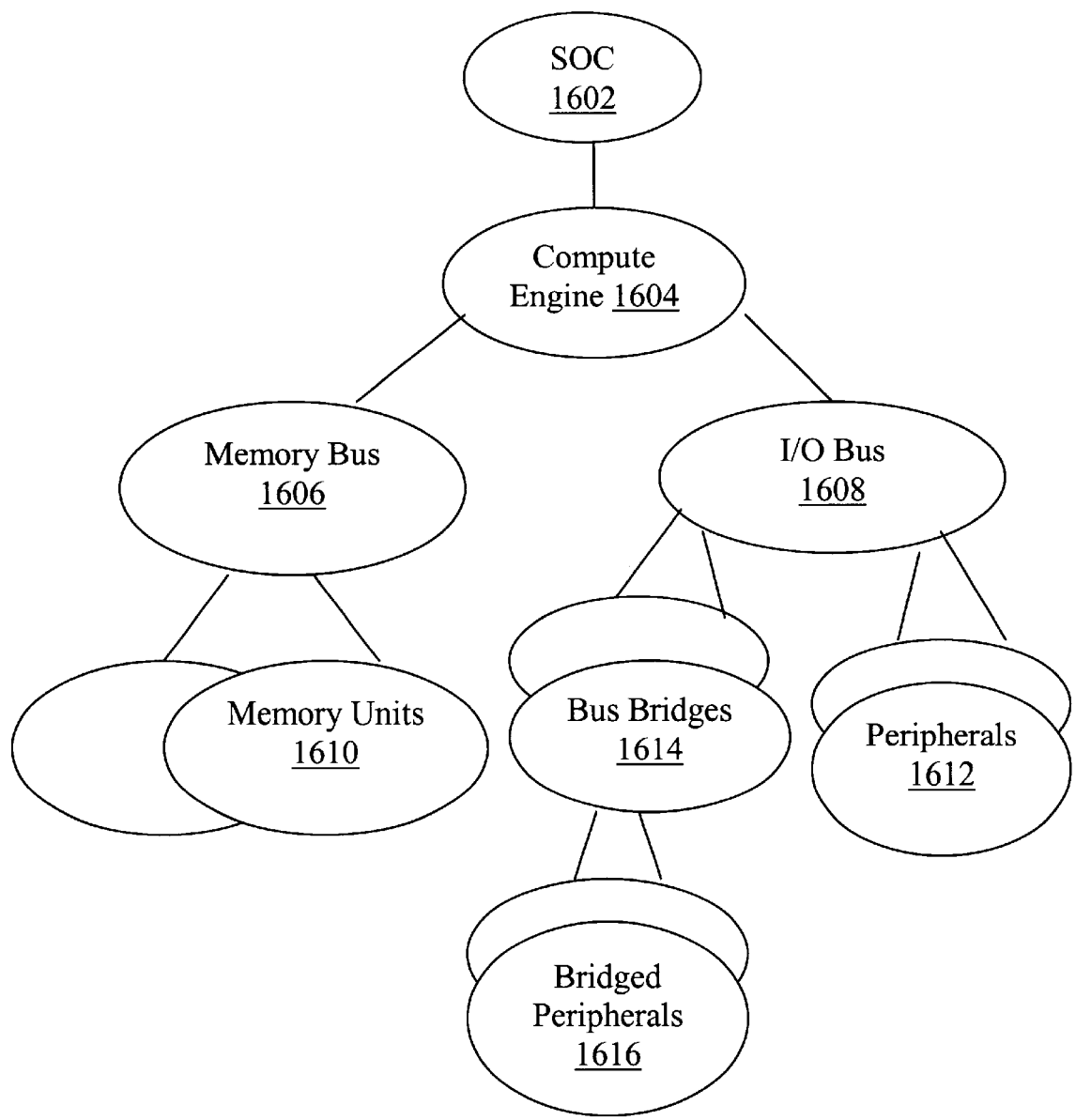
FIG. 16 illustrates a data structure suitable for use to store control information associated with a SOC design being formed.

FIG. 16 illustrates an example data structure suitable for use to record the selected IP and their associated information to form an SOC design, to practice the present invention, in accordance with one embodiment. For the embodiment, an object oriented data structure is employed. Root object 1602 is created for the SOC design. Information associated with the selected compute engine is stored in compute engine object 1604, created as a child object to root object 1602.

Information associated with the memory and I/O buses are stored in memory and I/O bus objects 1606 and 1608, created as child objects to compute engine object 1604. Similarly, information associated with the memory IP are stored in memory unit objects 1610, created as child objects to memory bus object 1606, and information associated with the directly attached peripheral IP are stored in peripheral objects 1612, created as child objects to I/O bus object 1608. Further, information associated with any bus bridges employed are stored in bus bridge objects 1614, created as child objects to I/O bus object 1608, and information associated with the indirectly attached peripheral IP are stored in peripheral objects 1616, created as child objects to bus bridge objects 1614.

Thus, it can be seen from the above description, the enhanced functions of Tool Suite 204 advantageously make easier the process of designing SOC, making more IP available for selection, customization and/or configuration.

Design and/or Verification Environment Configuration Script Generation

Having now described the advantageous process of the present invention to form a SOC design efficiently using Tool Suite 204 and third party provided IP, we turn now to describe the process for generating the design and/or its associated files under the present invention. The associated files may include e.g. hardware logic for simulation, embedded boot code and/or diagnostic software, and various verification environment configuration script files.

As alluded to earlier, the present invention contemplates a phased design and/or verification process. In one embodiment, the phases include a design generation phase, a simulation hardware logic generation phase, an embedded software generation phase, and a verification environment configuration script generation phase. In one embodiment, Tool Suite 204 includes various generators 288 to perform the corresponding generation functions of these phases. generators 288 of Tool Suite 204 may be supplemented with IP vendor supplied generators 228 to perform certain processing that are unique to the IP at the various phases. Applicable ones of the generators 288 and 228 are successively invoked and executed in a chained manner, depending on the request of the designer 202.

Accordingly, under the present invention, a SOC designer 202 upon formulating a SOC design 208 may desire to have the SOC design generated with or without additional design or verification processing. In the former case, the SOC designer 202 may also desire to have one or more of simulation hardware logic, related embedded software, such as boot code, diagnostic software, and/or verification environment configuration scripts generated.

Figure 10:
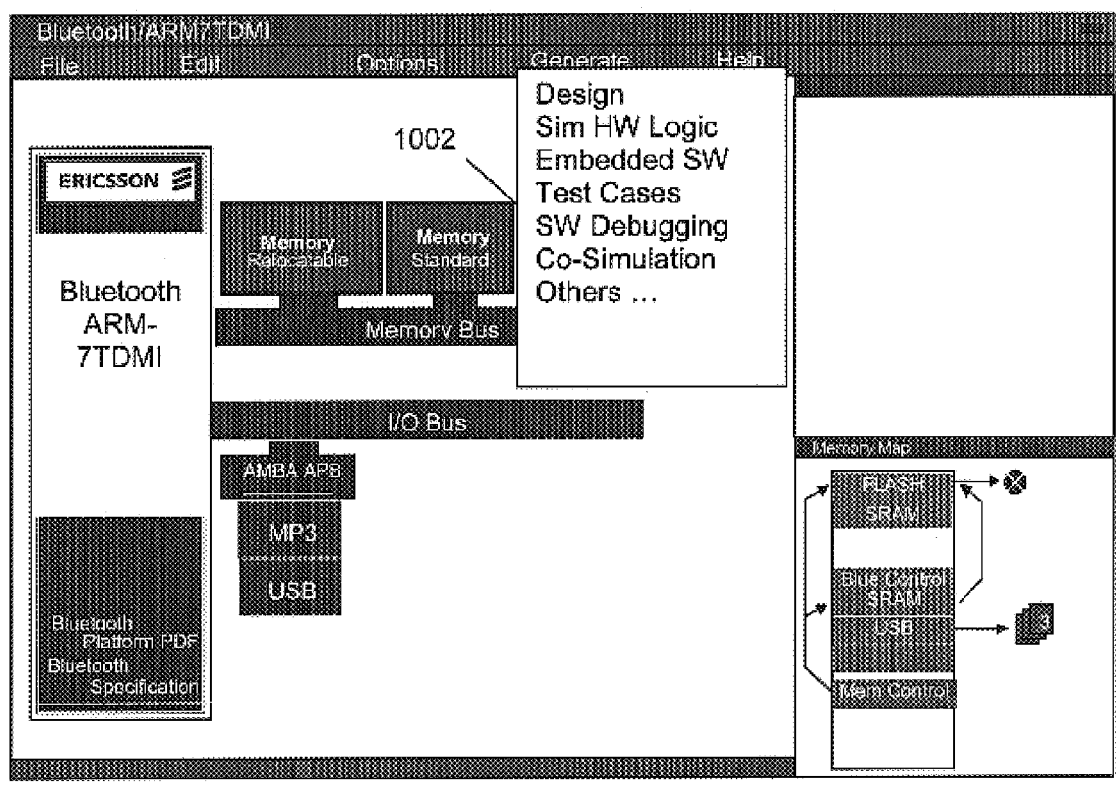
FIGS. 10–11 illustrate the GUI of PBSD EDA Tool Suite for generating the formed SOC design and/or configuring one or more verification environments, in accordance with one embodiment.
Figure 11:
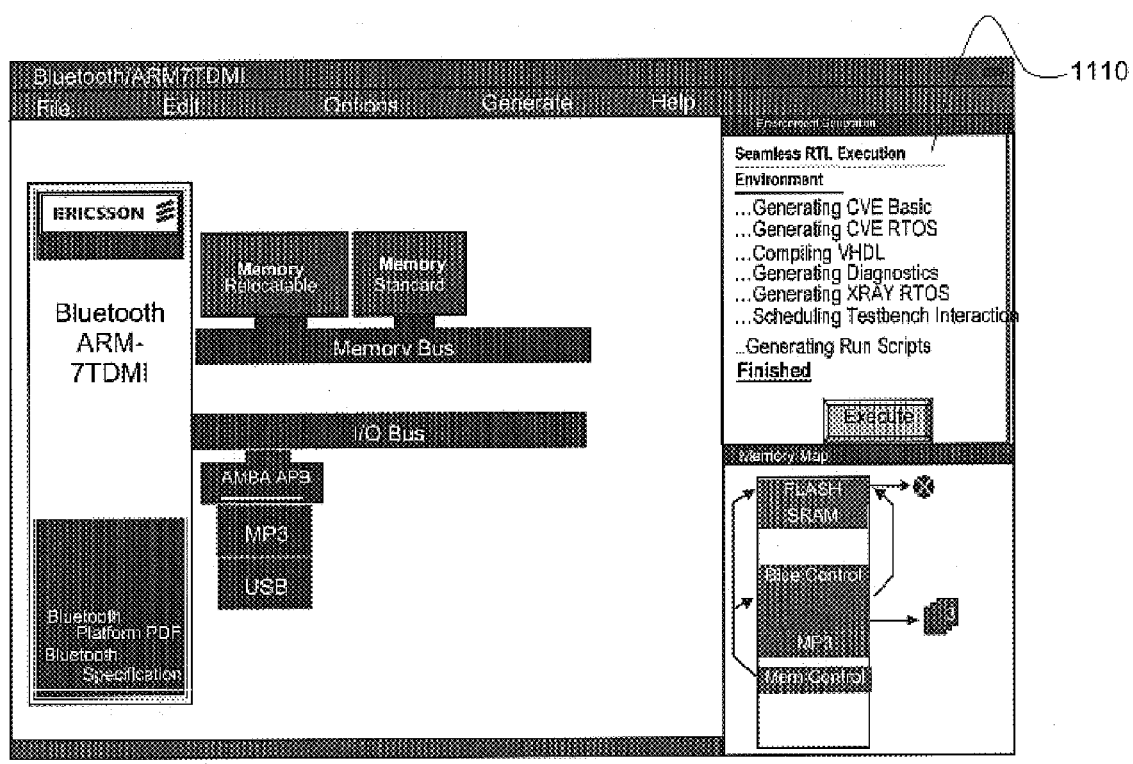

FIGS. 10 and 11 illustrate a GUI for facilitating generation of the design and the aforementioned associated files, in accordance with one embodiment. As illustrated, for the embodiment, GUI 280 includes a drop down menu 1002 offering a designer 202 the various generation choices. For the embodiment, the choices include generating the design, generate simulation hardware logic, generating the embedded software files, generating test cases, generating a configuration script for a software debugging environment, and generating a configuration script for a co-verification environment.

As illustrated in FIG. 11, GUI 280 includes a status area 1110 showing the status of the various selected generation. As described earlier, for each selected "generation", the corresponding chain of generators are successively invoked to perform the selected "generation".

Figure 17:
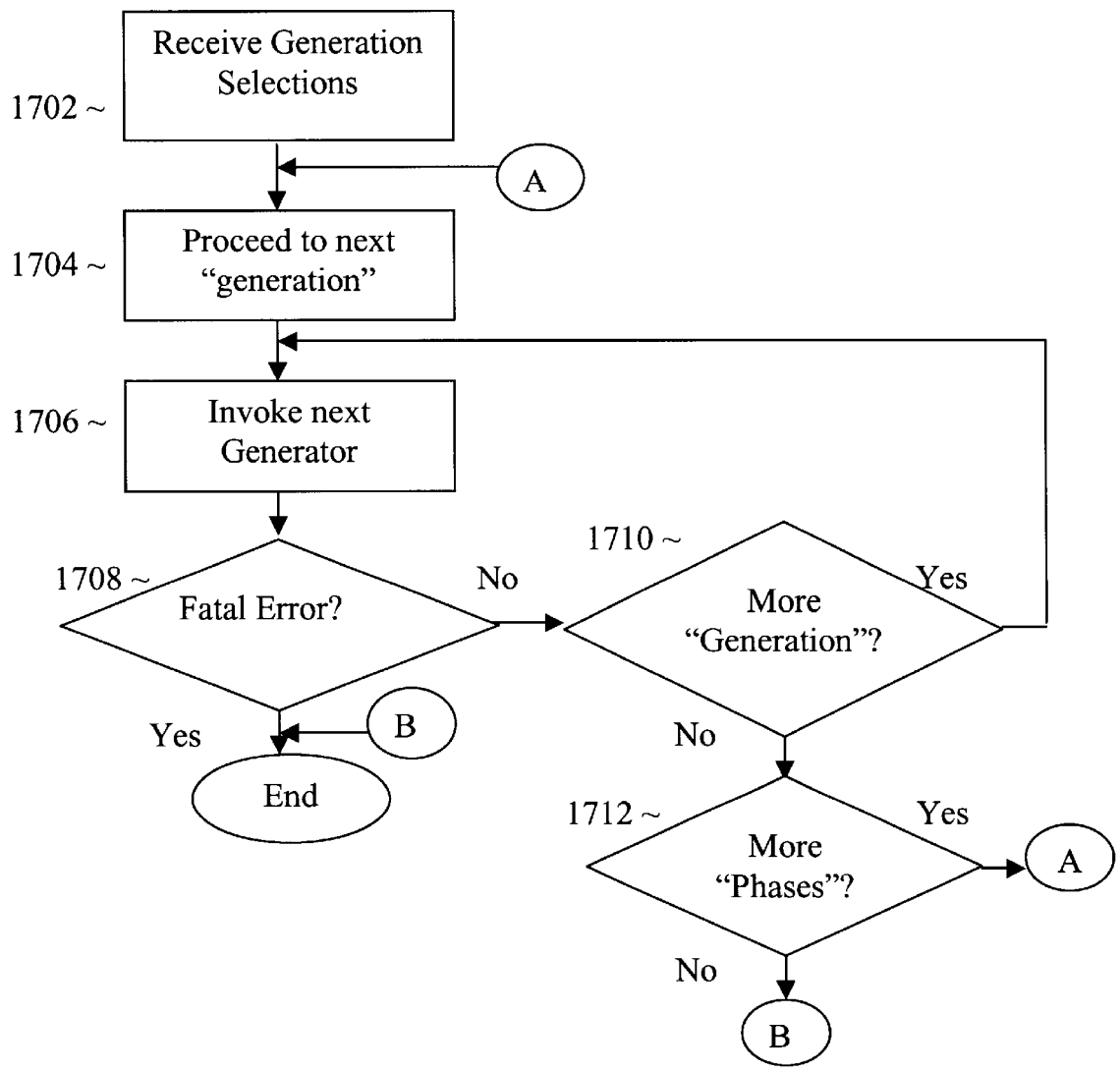
FIG. 17 illustrates the operational flow of the relevant aspect of the design and/or verification environment configuration script generation of the present invention, through a chain of generators, in accordance with one embodiment.

FIG. 17 illustrates the operation flow of the relevant aspects of generation control of EDA Tool Suite 204 in support of the GUI of FIGS. 10–11, in accordance with one embodiment. As illustrated, at block 1702, generation control 284 receives the generation selection. At block 1704, generation control 284 proceeds to facilitate the next appropriate generation. For the illustrated embodiment, if design generation is selected, it is facilitated first, resulting in a top level design file "stitching" together the selected IP components to be generated. Thereafter, if applicable, generation of the simulation hardware logic is facilitated. In one embodiment, the simulation hardware logic generates the hardware logic in accordance with a targeted simulator. An example of a targeted simulator is ModelSim available from Mentor Graphics. Similarly, if applicable, generation of embedded software, such as boot code, is facilitated. Further, generation of diagnostic software, including test cases may be facilitated.

After that, any one of a number of configuration script file generations for the verification environments may be facilitated. In alternate embodiments, the present invention may be practiced with other facilitation order sequence.

For each generation run, the generator traverses the IP components of the SOC design formed (using e.g. the data structure of FIG. 16 as a guide), accessing database 260 for information about the IP components as needed, blocks 1706–1708. For the illustrated embodiment, the process continues as long as no "fatal error" is encountered, block 1708. The nature and/or the type of error, or the severity of error to be considered as fatal error may be IP provider defined. Preferably, an option is provided for a designer 202 to specify the error threshold for terminating any one or all of the "generations".

When the successive generations have been successfully facilitated for a particular selected form of generation, generation control of Tool Suite 204 proceeds to the next appropriate selected generation, as alluded to earlier. In other words, the process continues back at block 1706. Blocks 1706–1710 again are performed for the "next"

selected form of generation. The process continues, until eventually all applicable generations have been facilitated, block 1712.

Figure 18:
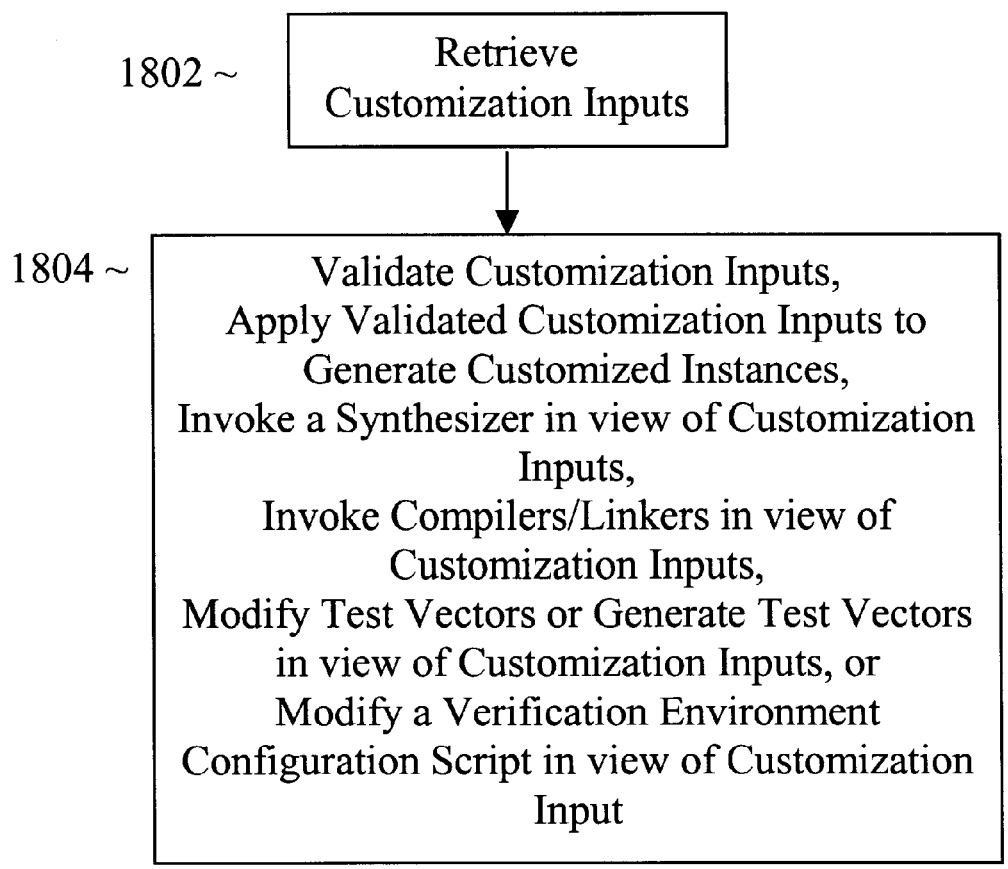
FIG. 18 illustrates the operational flow of the relevant aspect of a typical generator of the present invention, in accordance with one embodiment.

FIG. 18 illustrates the basic anatomy of the operation flow of a generator 228/288, in accordance with one embodiment. As illustrated, upon invocation, at block 1802, the generator 228/288 retrieves the relevant customization inputs from database 260. As alluded earlier, in one embodiment, the retrieval is made through the Get Methods of API 270. Upon retrieving the relevant customization inputs, the generator 228/288 performs validation if applicable, else generation in view of the customization inputs entered by the designer 202, block 1804. As described earlier, in each case, the exact nature of the generation is dependent on the IP.

Thus, it can be seen from the above description, the enhanced functions of Tool Suite 204 advantageously make easier the process of generating and debugging/verifying a SOC design 208.

Computing and Network Embodiment

Figure 19:
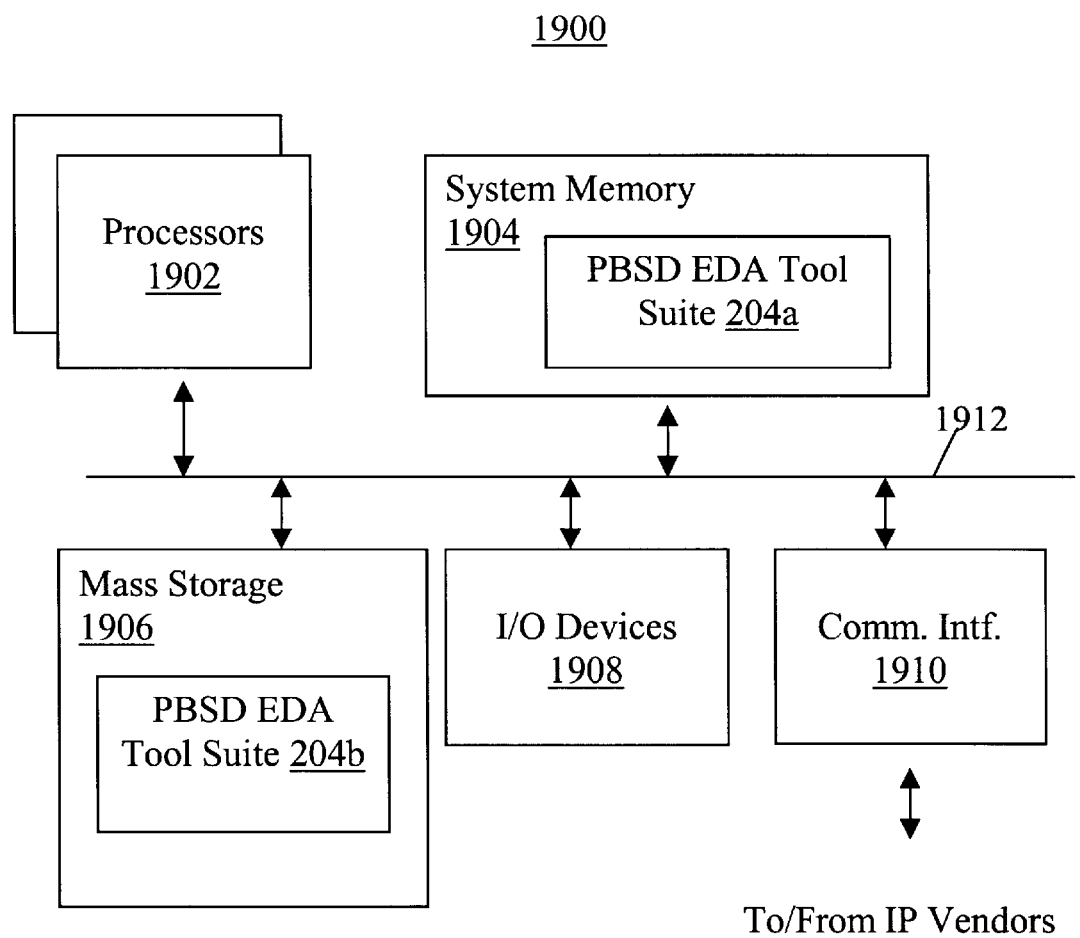
FIG. 19 illustrates a computing system suitable for practicing the present invention, in accordance with one embodiment.

FIG. 19 illustrates one embodiment of a computing apparatus suitable for use to practice the present invention. As shown, for the illustrated embodiment, computing device 1900 includes processor 1902 and processor bus 1912. Coupled to processor bus 1912 are system memory 1904, communication interface 1910, I/O devices 1904 and mass storage 1906. Communication interface 1910 in turn may be communicatively coupled to the servers of the various IP providers (for the retrieval of the actual component parts and related files).

These elements perform their conventional functions known in the art. In particular, mass storage 1906 and system memory 1914 are used to store permanent and working copies of the Tool Suite 204. The permanent copy may be pre-loaded into mass storage 1906 in a factory, loaded from distribution medium (note shown), or down loaded from a remote distribution source (not shown). Distribution medium may be a tape, a CD, a DVD or other storage medium of the like. The constitutions of these elements are known. Any one of a number of implementations of these elements known in the art may be used to form computer system 1900.

Certain embodiments may include additional components, may not require all of the above components, or may combine one or more components. Those skilled in the art will be familiar with a variety of alternative implementations.

Figure 20:
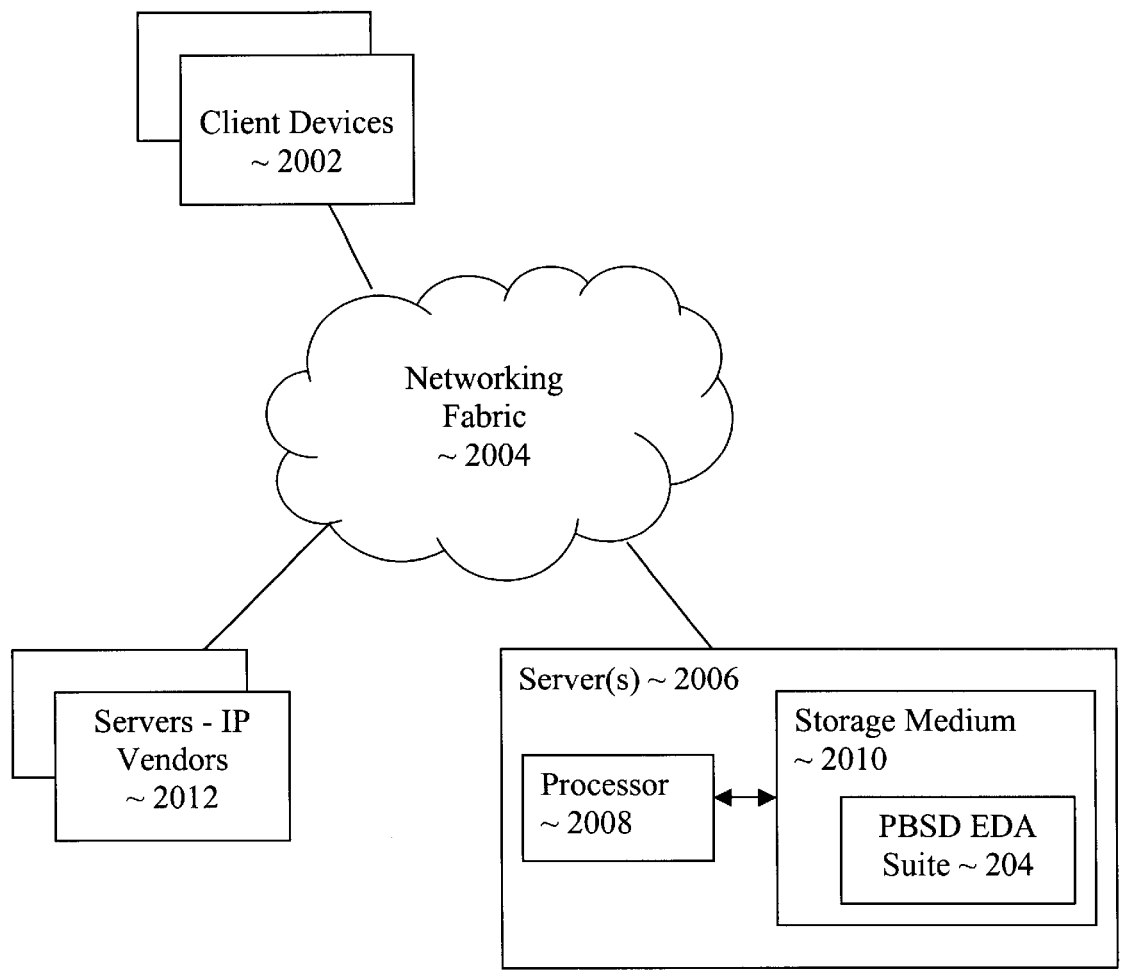
FIG. 20 illustrates a network view of a remote method for practicing the present invention, in accordance with one embodiment.

FIG. 20 shows a network environment for practicing the present invention, in accordance with one embodiment. In this embodiment, user controls, via a user client 2002, execution of EDA tool suite 204 incorporated with the teachings of the present invention. The user interacts with one or more servers 2006 executing the EDA tool suite 204 through a network 2004Component parts and their related files are also retrieved from the IP vendors' servers 2012 through network 2004 The design results are sent back from server 2006 to the user via network 2004 and user client 2002. Communications between user client 2002, IP vendors' servers 2012 and servers 2006 may be accomplished via any one of a number of communication protocols known in the art, including but are not limited to the TCP/IP protocol. In other embodiments, other communication protocols may be employed.

Thus, it can be seen from the above description, the present invention may be practiced on a wide range of standalone and/or networked systems.

Conclusion & Epilog

Thus, a novel platform based approach to SOC design, advantageously and efficiently allowing third party IP to be used by designers to form SOC designs has been described. While the present invention has been described with the foregoing embodiments, the present invention is not so limited. The present invention may be practiced with modifications and extensions to the earlier described embodiments. The full scope of the present invention is defined by the claims to follow.

What is claimed is:

1. An IP package comprising:
   a selected one of one or more machine readable components of an IP block and one or more machine readable pointers pointing to one or more locations from which the one or more components of the IP block can be retrieved;
   machine readable descriptions describing customizable attributes of said one or more components; and
   machine readable connectivity descriptions describing how the IP block is to be connected to include the IP block as part of an integrated circuit (IC).

2. The IP package of claim 1, wherein said IP block comprises a plurality of pins, and said machine readable connectivity descriptions comprise machine readable descriptions of said pins.

3. The IP package of claim 1, wherein said machine readable connectivity descriptions comprise machine readable descriptions of implemented bus signals of a known bus.

4. The IP package of claim 1, wherein said IP block comprises a plurality of pins, and said machine readable connectivity descriptions comprise machine readable descriptions of said pins, implemented bus signals of a known bus, and mapping of said pins to said implemented bus signals of the known bus.

5. The IP package of claim 4, wherein said machine readable connectivity descriptions further comprise machine readable handling descriptions of unimplemented bus signals of a known bus, and said machine readable handling descriptions of unimplemented bus signals of a known bus comprise a reference to a bus decoding template comprising default handling of unimplemented bus signals of said known bus.

6. The IP package of claim 5, wherein said IP package further comprises machine readable descriptions describing customizable attributes of said components of said IP block, and said machine readable descriptions describing customizable attributes of said components of said IP block comprise descriptions of methods of resolution for said customizable attributes described.

7. The IP package of claim 6, wherein said IP package further comprises machine readable descriptions describing one or more supplemental generators associated with said IP block, to be executed at designated phases of a design/verification process, to transform design information of said IC, from a first state to a second state; and machine readable descriptions describing one or more verification environment configuration requirements of said IP block for one or more verification environments.

8. The IP package of claim 1, wherein said machine readable descriptions describing customizable attributes includes a plurality of predefined choices for designer customization of said component, wherein said predefined choices are presented to said designer when the designer selects said component.

9. The IP package of claim 8, wherein said machine readable descriptions describing customizable attributes of said components of said IP block comprise descriptions of methods of resolution for said customizable attributes described.

10. The IP package of claim 9, wherein said descriptions of methods of resolution for said customizable attributes described comprise at least one of a first description of a first method of resolution through user input, and a second description of a second method of resolution through dependency on one or more other customizable attributes.

11. The IP package of claim 1, wherein said IP package further comprises machine readable descriptions describing user interface elements for use to prompt a designer in specifying customizable attributes of said IP block.

12. The IP package of claim 1, wherein said IP package further comprises machine readable descriptions describing at least a selected one of one or more embedded software and one or more diagnostic software of said IP block.

13. The IP package of claim 1, wherein said IP package further comprises machine readable descriptions describing one or more supplemental generators associated with said IP block, to be executed at designated phases of a design/verification process, to transform design information of said IC, from a first state to a second state.

14. The IP package of claim 1, wherein said IP package further comprises machine readable descriptions describing one or more verification environment configuration requirements of said IP block for one or more verification environments.

15. An IP package comprising:
a selected one of one or more machine readable components of an IP block and one or more machine readable pointers pointing to one or more locations from which the one or more components of the IP block can be retrieved; and
machine readable connectivity descriptions describing how the IP block is to be connected to include the IP block as part of an integrated circuit (IC),
wherein said machine readable connectivity descriptions comprise machine readable handling descriptions of unimplemented bus signals of a known bus.

16. The IP package of claim 15, wherein said machine readable handling descriptions of unimplemented bus signals of a known bus comprise a reference to a bus decoding template comprising default handling of unimplemented bus signals of said known bus.

17. An IP package comprising:
a selected one of one or more machine readable components of an IP block and one or more machine readable pointers pointing to one or more locations from which the one or more components of the IP block can be electronically retrieved; and
machine readable connectivity descriptions describing customizable attributes of said components of said IP, including user interface elements for use to prompt a designer in specifying said customizable attributes when including said IP block in an integrated circuit (IC).

18. The IP package of claim 17, wherein said machine readable descriptions describing customizable attributes of components of said IP block comprise descriptions of methods of resolution for said customizable attributes described.

19. The IP package of claim 18, wherein said descriptions of method of resolution for said customizable attributes described comprise at least one of a first description of a first method of resolution through user input, and a second description of a second method of resolution through dependency on one or more other customizable attributes.

20. The IP package of claim 17, wherein said IP package further comprises machine readable descriptions describing one or more supplemental generators of said IP block to be executed at designated design/verification phases of a design process, to transform design information of said IC, from a first state to a second state.

21. The IP package of claim 17, wherein said IP package further comprises machine readable descriptions describing one or more verification environment configuration requirements of said IP block for one or more verification environments.

22. An IP package comprising:
a selected one of one or more machine readable components of an IP block and one or more machine readable pointers pointing to one or more locations from which the one or more components of the IP block can be electronically retrieved; and
machine readable descriptions describing one or more supplemental design/verification generators associated with said IP block to be executed at designated design/verification phases of a design process, to transform design information of an integrated circuit (IC) including said IP block, from a first state to a second state.

23. The IP package of claim 22, wherein said IP package further comprises machine readable descriptions describing one or more verification environment configuration requirements of said IP block for one or more verification environments.

24. A machine implemented method comprising:
creating a selected one of one or more machine readable components of an IP block and one or more machine readable pointers pointing to one or more locations from which the one or more components of the IP block can be retrieved;
using a compatibility analyzer to present a user with a limited list of components that are compatible with components that said user has previously added to said IP block;
receiving a user selection of one of said listed components for addition to said IP block;
creating machine readable connectivity descriptions describing how the IP block is to be connected to include the IP block as part of an integrated circuit (IC); and
forming an IP package with at least said created components/pointers to locations of the components, and said connectivity description of said IP block.

25. The method of claim 24, wherein said IP block comprises a plurality of pins, and said creating of machine readable connectivity descriptions comprises creating machine readable descriptions of said pins.

26. The method of claim 24, wherein said creating of machine readable connectivity descriptions comprises creating machine readable descriptions of implemented bus signals of a known bus.

27. The method of claim 24, wherein said creating of machine readable connectivity descriptions comprises creating machine readable handling descriptions of unimplemented bus signals of a known bus.

28. The method of claim 27, wherein said creating of machine readable handling descriptions of unimplemented bus signals of a known bus comprises creating a reference to a bus decoding template comprising default handling of unimplemented bus signals of said known bus.

29. The method of claim 24, wherein said IP block comprises a plurality of pins, and said creating of machine readable connectivity descriptions comprises creating machine readable descriptions of said pins, implemented bus signals of a known bus, and mapping of said pins to said implemented bus signals of the known bus.

30. The method of claim 29, wherein said creating of machine readable connectivity descriptions further comprises creating machine readable handling descriptions of unimplemented bus signals of a known bus, and said creating of machine readable handling descriptions of unimplemented bus signals of a known bus comprises creating a reference to a bus decoding template comprising default handling of unimplemented bus signals of said known bus.

31. The method of claim 30, wherein
said method further comprises creating machine readable descriptions describing customizable attributes of said components of said IP block, and said creating of machine readable descriptions describing customizable attributes of said components of said IP block comprises creating descriptions of methods of resolution for said customizable attributes described; and
said forming of an IP package further includes said machine readable descriptions describing customizable attributes of said IP block.

32. The method of claim 31, wherein said method further comprises
creating machine readable descriptions describing one or more supplemental generators associated with said IP block, to be executed at designated phases of a design/verification process, to transform design information of said IC, from a first state to a second state, and
creating machine readable descriptions describing one or more verification environment configuration requirements of said IP block for one or more verification environments; and said forming of an IP package further includes said machine readable descriptions describing said one or more supplemental generators of said IP block, and said machine readable descriptions describing said one or more verification environment configuration requirements of said IP block.

33. The method of claim 24 wherein said method further comprises creating machine readable descriptions describing customizable attributes of said components of said IP block, and said forming of an IP package further includes said machine readable descriptions describing said customizable attributes of said components of said IP block.

34. The method of claim 33, wherein said creating of machine readable descriptions describing customizable attributes of said components of said IP block comprises creating descriptions of methods of resolution for said customizable attributes described.

35. The method of claim 34, wherein said creating of descriptions of methods of resolution for said customizable attributes described comprises creating at least one of a first description of a first method of resolution through user input, and a second description of a second method of resolution through dependency on one or more other customizable attributes.

36. The method of claim 24, wherein said method further comprises creating machine readable descriptions describing user interface elements for use to prompt a designer in specifying customizable attributes of said IP block, and said forming of an IP package further includes said machine readable descriptions describing said user interface elements.

37. The IP package of claim 24, wherein said method further comprises machine readable descriptions describing at least a selected one of one or more embedded software and one or more diagnostic software of said IP block, and said forming of an IP package further includes said machine readable descriptions describing said one or more embedded/diagnostic software of said IP block.

38. The method of claim 24, wherein said method further comprises machine readable descriptions describing one or more supplemental generators associated with said IP block, to be executed at designated phases of a design/verification process, to transform design information of said IC, from a first state to a second state, and said forming of an IP package further includes said machine readable descriptions describing said supplemental generators associated with said IP block.

39. The method of claim 24, wherein said method further comprises creating machine readable descriptions describing one or more verification environment configuration requirements of said IP block for one or more verification environments, and said forming of an IP package further includes said machine readable descriptions describing said one or more verification environment configuration requirements of said IP block.

40. A machine implemented method comprising:
creating a selected one of one or more machine readable components of an IP block and one or more machine readable pointers pointing to one or more locations from which the one or more components of the IP block can be electronically retrieved;
creating machine readable descriptions describing customizable attributes of said components of said IP, including user interface elements for use to prompt a designer in specifying said customizable attributes when including said IP block in an integrated circuit (IC); and
forming an IP package with said one or more components/pointers to locations of said components of said IP block, and said machine readable descriptions describing customizable attributes of said components of said IP block.

41. The method of claim 40, wherein said creating of machine readable descriptions describing customizable attributes of components of said IP block comprises creating descriptions of methods of resolution for said customizable attributes described.

42. The method of claim 41, wherein said creating of descriptions of method of resolution for said customizable attributes described comprises creating at least one of a first description of a first method of resolution through user input, and a second description of a second method of resolution through dependency on one or more other customizable attributes.

43. The method of claim 41, wherein said method further comprises creating machine readable descriptions describing one or more supplemental generators of said IP block to be executed at designated design/verification phases of a design process, to transform design information of said IC, from a first state to a second state, and said forming of an IP package further includes said machine readable descriptions describing said supplemental generators.

44. The method of claim 41, wherein said method further comprises creating machine readable descriptions describing one or more verification environment configuration requirements of said IP block for one or more verification environments, and said forming of an IP package further includes said machine readable descriptions describing said one or more verification environment configuration requirements.

45. A machine implemented method comprising:
creating a selected one of one or more machine readable components of an IP block and one or more machine readable pointers pointing to one or more locations from which the one or more components of the IP block can be electronically retrieved;

creating machine readable descriptions describing one or more supplemental generators associated with said IP block to be executed at designated design/verification phases of a design process, to transform design information of an integrated circuit (IC) including said IP block, from a first state to a second state; and forming an IP package with said one or more components/pointers to locations of said components of said IP block, and said supplemental generators associated with said IP block.

46. The method of claim 45, wherein said method further comprises creating machine readable descriptions describing one or more verification environment configuration requirements of said IP block for one or more verification environments, and said forming of an IP package further includes said machine readable descriptions describing said verification environment configuration requirements of said IP block.

* * * * *